US012634451B2

(12) United States Patent
Tan et al.

(10) Patent No.: US 12,634,451 B2
(45) Date of Patent: May 19, 2026

(54) METHOD AND APPARATUS FOR SIGNALING PURPOSE FOR NEURAL-NETWORK POST-FILTER GROUPING CHARACTERISTIC SEI MESSAGE FOR CODED BITSTREAM

(71) Applicant: LG ELECTRONICS INC., Seoul (KR)

(72) Inventors: Hendry Tan, Seoul (KR); Junghak Nam, Seoul (KR); Jaehyun Lim, Seoul (KR); Seunghwan Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/899,429

(22) Filed: Sep. 27, 2024

(65) Prior Publication Data

US 2025/0106393 A1 Mar. 27, 2025

Related U.S. Application Data

(60) Provisional application No. 63/540,672, filed on Sep. 27, 2023.

(51) Int. Cl.
H04N 19/117 (2014.01)
H04N 19/70 (2014.01)

(52) U.S. Cl.
CPC ........... H04N 19/117 (2014.11); H04N 19/70 (2014.11)

(58) Field of Classification Search
CPC .................................................. H04N 19/117
USPC ......................................................... 375/240
See application file for complete search history.

(56) References Cited

U.S. PATENT DOCUMENTS

2015/0373373 A1* 12/2015 Wang ................... H04N 19/187
                                                              375/240.26
2022/0329837 A1 10/2022 Li et al.
2023/0112309 A1 4/2023 Hannuksela et al.
2023/0209074 A1 6/2023 Takada et al.
2023/0283772 A1 9/2023 Karczewics et al.

OTHER PUBLICATIONS

PCT International Application No. PCT/KR2024/014654, International Search Report dated Jan. 10, 2025, 10 pages.
Hannuksela et al., "AHG9: Combined text of JVET-AE0052 and JVET-AE0063," JVET-AE0298-v1, Joint Video Experts Team (JVET) of ITU-T SG 16 WP 3 and ISO/IEC JTC 1/SC 29, 31st Meeting, Jul. 2023, 8 pages.

* cited by examiner

*Primary Examiner* — Amir Shahnami
(74) *Attorney, Agent, or Firm* — LEE, HONG, DEGERMAN, KANG & WAIMEY

(57) ABSTRACT

An image decoding method including obtaining a neural network post-filter (NNPF) group (NNPFG) characteristics supplemental enhancement information (SEI) message specifying information related to a group of two or more NNPFs to be applied to image data; determining a grouping type of the group of the two or more NNPFs based on the message; based on the grouping type indicating that only one of the group of the two or more NNPFs is to be selected to be applied, or that the group of the two or more NNPFs are to be applied in parallel, obtaining a value corresponding to a purpose of each of the group of the two or more NNPFs; and applying at least one of the group of the two or more NNPFs to the image data based the obtained value.

13 Claims, 6 Drawing Sheets

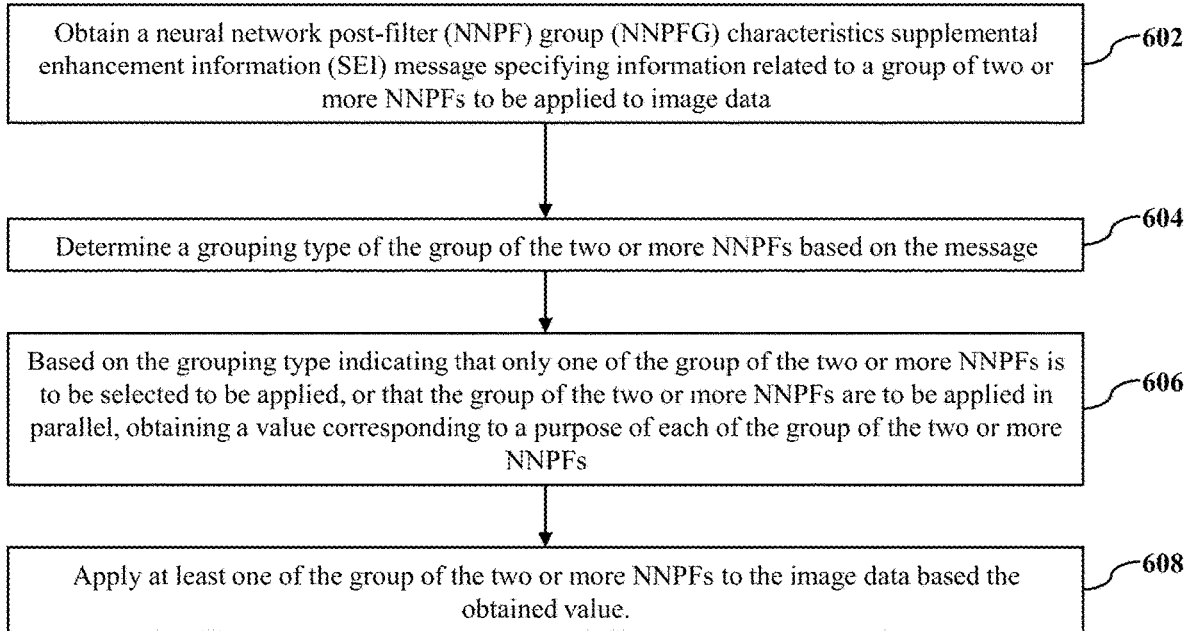

600

Obtain a neural network post-filter (NNPF) group (NNPFG) characteristics supplemental enhancement information (SEI) message specifying information related to a group of two or more NNPFs to be applied to image data ⟋602

Determine a grouping type of the group of the two or more NNPFs based on the message ⟋604

Based on the grouping type indicating that only one of the group of the two or more NNPFs is to be selected to be applied, or that the group of the two or more NNPFs are to be applied in parallel, obtaining a value corresponding to a purpose of each of the group of the two or more NNPFs ⟋606

Apply at least one of the group of the two or more NNPFs to the image data based the obtained value. ⟋608

FIG. 6

METHOD AND APPARATUS FOR SIGNALING PURPOSE FOR NEURAL-NETWORK POST-FILTER GROUPING CHARACTERISTIC SEI MESSAGE FOR CODED BITSTREAM

CROSS-REFERENCE TO RELATED APPLICATION

Pursuant to 35 U.S.C. § 119 (e), this application claims the benefit of U.S. Provisional Patent Application No. 63/540,672, filed on Sep. 27, 2023, the contents of which are hereby incorporated by reference herein in its entirety.

FIELD

The present disclosure generally relates to image encoding/decoding, and more particularly signaling purpose for neural-network post-filter grouping characteristic SEI messages.

BACKGROUND

Recently, demand for high-resolution and high-quality images such as high definition (HD) images and ultra-high definition (UHD) images is increasing in various fields. As resolution and quality of image data are improved, the amount of transmitted information or bits relatively increases as compared to existing image data. An increase in the amount of transmitted information or bits causes an increase in transmission cost and storage cost.

In Versatile Supplemental Enhancement Information Messages for coded video bitstreams (VSEI) standard-based neural-network post-filter (NNPF) design, neural-network post-filter characteristics (NNPFC) messages are used which define neural-network post-filters (NNPFs) to be applied to images post-filtering, and the activation and deactivation of the NNPFs via neural-network post-filter activation (NNPFA) messages. Particularly the neural-network post-filter characteristics (NNPFC) SEI message specifies a neural network that may be used as a post-processing filter. The use of specified neural network post-processing filters (NNPFs) for specific pictures is indicated with the neural-network post-filter activation (NNPFA) SEI messages.

However, information encoded and encapsulated in the SEI messages according to the existing art do not provide all information required to accurately and efficiently make relevant determinations as to the application of the specified NNPFs. Accordingly, there is a need for improved high-efficient image compression technology for effectively transmitting, storing and reproducing information on high-resolution and high-quality images.

SUMMARY

An object of the present disclosure is to provide an image encoding/decoding method and apparatus with improved encoding/decoding efficiency to address the above deficiencies in the existing art.

An embodiment of the present disclosure includes an image decoding method performed by an image decoding apparatus, the image decoding method comprising obtaining a neural network post-filter (NNPF) group (NNPFG) characteristics supplemental enhancement information (SEI) message specifying information related to a group of two or more NNPFs to be applied to the image data; determining a grouping type of the group of the two or more NNPFs based on the message; based on the grouping type indicating that only one of the group of the two or more NNPFs is to be selected to be applied, or that the group of the two or more NNPFs are to be applied in parallel, obtaining a value corresponding to a purpose of each of the group of the two or more NNPFs; and applying at least one of the group of the two or more NNPFs to the image data based the obtained value.

In some embodiments, the obtained value corresponds to a union of values corresponding to the purpose of each of the group of the two or more NNPFs.

In some embodiments, at least one member of the group of the two or more NNPFs is a member NNPF group.

In some embodiments, the obtained value corresponding to a purpose of the member NNPF group is a union of values corresponding to purposes of all member NNPFs of the member NNPF group.

According to another embodiment of the present disclosure, provided is an image decoding method performed by an image decoding apparatus, the image decoding method including obtaining a neural network post-filter (NNPF) group (NNPFG) characteristics supplemental enhancement information (SEI) message specifying information related to a group of two or more NNPFs to be applied to the image data; obtaining a value corresponding to a purpose of the group of the two or more NNPFs comprising a union of values corresponding to purposes of all member NNPFs of the group; and applying at least one of the group of two or more NNPFs to the image data based on the obtained value.

In some embodiments, a member of the group may be an NNPF group comprising another group of two or more NNPFs.

In some embodiments, the SEI message comprises a flag indicating whether the value corresponding to the purpose of the group of the two or more NNPFs is present in the SEI message.

In some embodiments, the at least one value comprises a list including a purpose value for each member NNPF of the group.

In some embodiments, the at least one value comprises a union of values corresponding to purposes of all member NNPFs of the group.

Another embodiment of the present disclosure includes an image encoding method performed by an image encoding apparatus, the image encoding method comprising encoding a neural network post-filter (NNPF) group (NNPFG) characteristics supplemental enhancement information (SEI) message including information related to a group of two or more NNPFs to be applied to the image data, wherein a grouping type of the group of the two or more NNPFs are determinable based on the encoded SEI message, wherein based on the grouping type indicating that only one of the group of the two or more NNPFs is to be selected to be applied, or that the group of the two or more NNPFs are to be applied in parallel, a value is encoded in the SEI message corresponding to a purpose of each of the group of the two or more NNPFs; and transmitting the encoded SEI message wherein, based on the SEI message, at least one of the group of the two or more NNPFs to the image data are to be applied based the encoded value.

In some embodiments, the encoded value corresponds to a union of values corresponding to the purpose of each of the group of the two or more NNPFs.

In some embodiments, at least one member of the group of the two or more NNPFs is a member NNPF group.

In some embodiments, the encoded value corresponding to a purpose of the member NNPF group is a union of values corresponding to purposes of all member NNPFs of the member NNPF group.

Another embodiment of the present disclosure includes a computer-readable recording medium storing a bitstream generated by embodiments of the image encoding methods disclosed herein.

The present disclosure is not limited to what has been described above, and other aspects and advantages of the present disclosure not mentioned above will be understood through the following description of implementations of the present disclosure. Further, it will be understood that the aspects and advantages of the present disclosure may be achieved by the configurations described in claims and combinations thereof.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIG. 6 is a flowchart illustrating an image decoding method according to an embodiment of the present disclosure.

Figure 1:
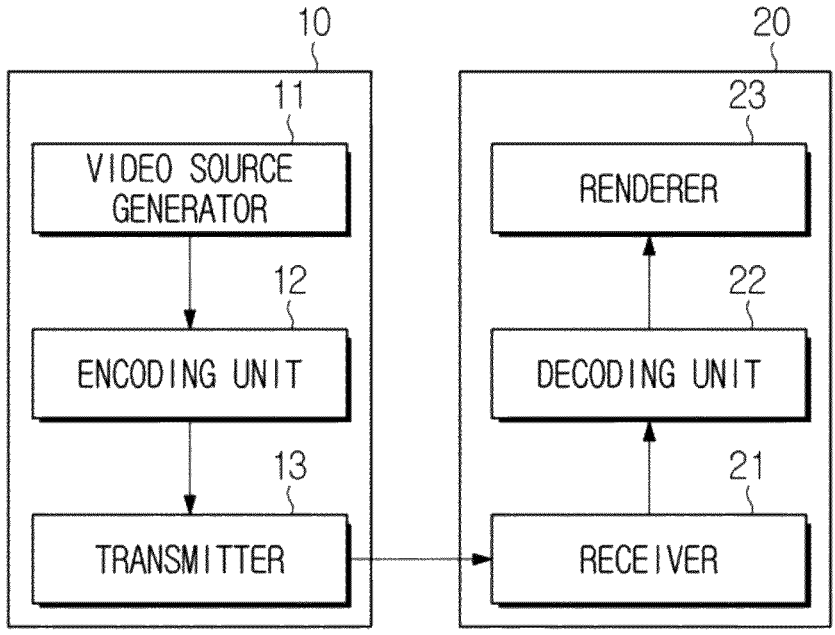
FIG. 1 is a view illustrating an example of a video coding system, to which an embodiment of the present disclosure is applicable.

In accordance with common practice, the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

Hereinafter, the implementations disclosed in the present specification will be described in detail with reference to the accompanying drawings, the same or similar elements regardless of a reference numeral are denoted by the same reference numeral, and a duplicate description thereof will be omitted. In the following description, the terms "module" and "unit" for referring to elements are assigned and used interchangeably in consideration of convenience of explanation, and thus, the terms per se do not necessarily have different meanings or functions. Wherever possible, the same reference numbers will be used throughout the drawings to refer to the same or like parts. In the following description, known functions or structures, which may confuse the substance of the present disclosure, are not explained. The accompanying drawings are used to help easily explain various technical features, and it should be understood that the implementations presented herein are not limited by the accompanying drawings. As such, the present disclosure should be construed to extend to any alterations, equivalents, and substitutes in addition to those which are particularly set out in the accompanying drawings.

The terminology used herein is used for the purpose of describing particular example implementations only and is not intended to be limiting. As used herein, the singular forms "a," "an," and "the" may be intended to include the plural forms as well, unless the context clearly indicates otherwise. The terms "comprises," "comprising," "includes," "including," "containing," "has," "having" or other variations thereof are inclusive and therefore specify the presence of stated features, integers, steps, operations, elements, and/or components, but do not preclude the presence or addition of one or more other features, integers, steps, operations, elements, components, and/or groups thereof. Furthermore, these terms such as "first," "second," and other numerical terms, are used only to distinguish one element from another element. These terms are generally only used to distinguish one element from another.

Hereinafter, implementations of the present disclosure will be described in detail with reference to the accompanying drawings. Like reference numerals designate like elements throughout the specification, and overlapping descriptions of the elements will not be provided.

FIG. 1 is a view showing an example of a video coding system to which an embodiment of the present disclosure is applicable.

The video coding system according to an embodiment may include an encoding apparatus 10 and a decoding apparatus 20. The encoding apparatus 10 may deliver encoded video and/or image information or data to the decoding apparatus 20 in the form of a file or streaming via a digital storage medium or network.

The encoding apparatus 10 according to an embodiment may include a video source generator 11, an encoding unit (otherwise referred to as an encoder) 12 and a transmitter 13. The decoding apparatus 20 according to an embodiment may include a receiver 21, a decoding unit (otherwise referred to as a decoder) 22 and a renderer 23. The encoding unit 12 may be called a video/image encoding apparatus, and the decoding unit 22 may be called a video/image decoding apparatus. The transmitter 13 may be included in the encoding unit 12. The receiver 21 may be included in the decoding unit 22. The renderer 23 may include a display and the display may be configured as a separate device or an external component.

The video source generator 11 may acquire a video/image through a process of capturing, synthesizing, or generating the video/image. The video source generator 11 may include a video/image capture device and/or a video/image generating device. The video/image capture device may include, for example, one or more cameras, video/image archives including previously captured video/images, and the like. The video/image generating device may include, for example, computers, tablets and smartphones, and may electronically generate video/images. For example, a virtual video/image may be generated through a computer or the like. In this case, the video/image capturing process may be replaced by a process of generating related data.

The encoding unit 12 may encode an input video/image. The encoding unit 12 may perform a series of procedures such as prediction, transform, and quantization for compression and coding efficiency. The encoding unit 12 may output encoded data (encoded video/image information) in the form of a bitstream.

The transmitter 13 may obtain the encoded video/image information or data output in the form of a bitstream and forward it to the receiver 21 of the decoding apparatus 20 or another external object through a digital storage medium or a network in the form of a file or streaming data. The digital storage medium may include various storage mediums such as USB, SD, CD, DVD, Blu-ray, HDD, SSD, and the like.

The transmitter 13 may include an element for generating a media file through a predetermined file format and may include an element for transmission through a broadcast/communication network. The transmitter 13 may be provided as a transmission device separate from the encoding apparatus 12, and in this case, the transmission device may include at least one processor that acquires encoded video/image information or data output in the form of a bitstream and a transmission unit for transmitting it in the form of a file or streaming data. The receiver 21 may extract/receive the bitstream from the storage medium or network and transmit the bitstream to the decoding unit 22.

The decoding unit 22 may decode the video/image by performing a series of procedures such as dequantization, inverse transform, and prediction corresponding to the operations performed by the encoding unit 12.

The renderer 23 may render the decoded video/image. The rendered video/image may be displayed through the display.

Figure 3:
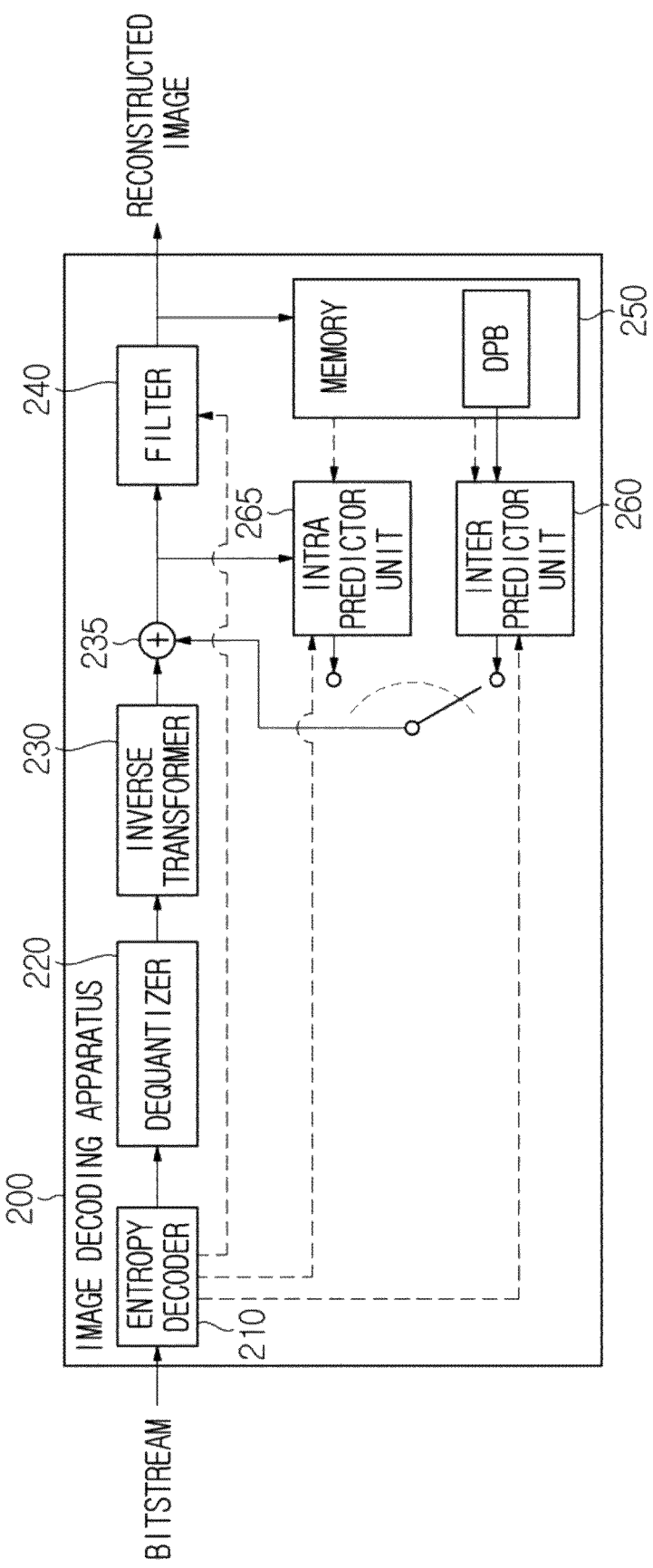
FIG. 3 is a view illustrating an example of an image decoding apparatus, to which an embodiment of the present disclosure is applicable.

An overview of an image encoding apparatus will be provided. FIG. 3 is a view schematically showing an image encoding apparatus, to which an embodiment of the present disclosure is applicable.

Figure 2:
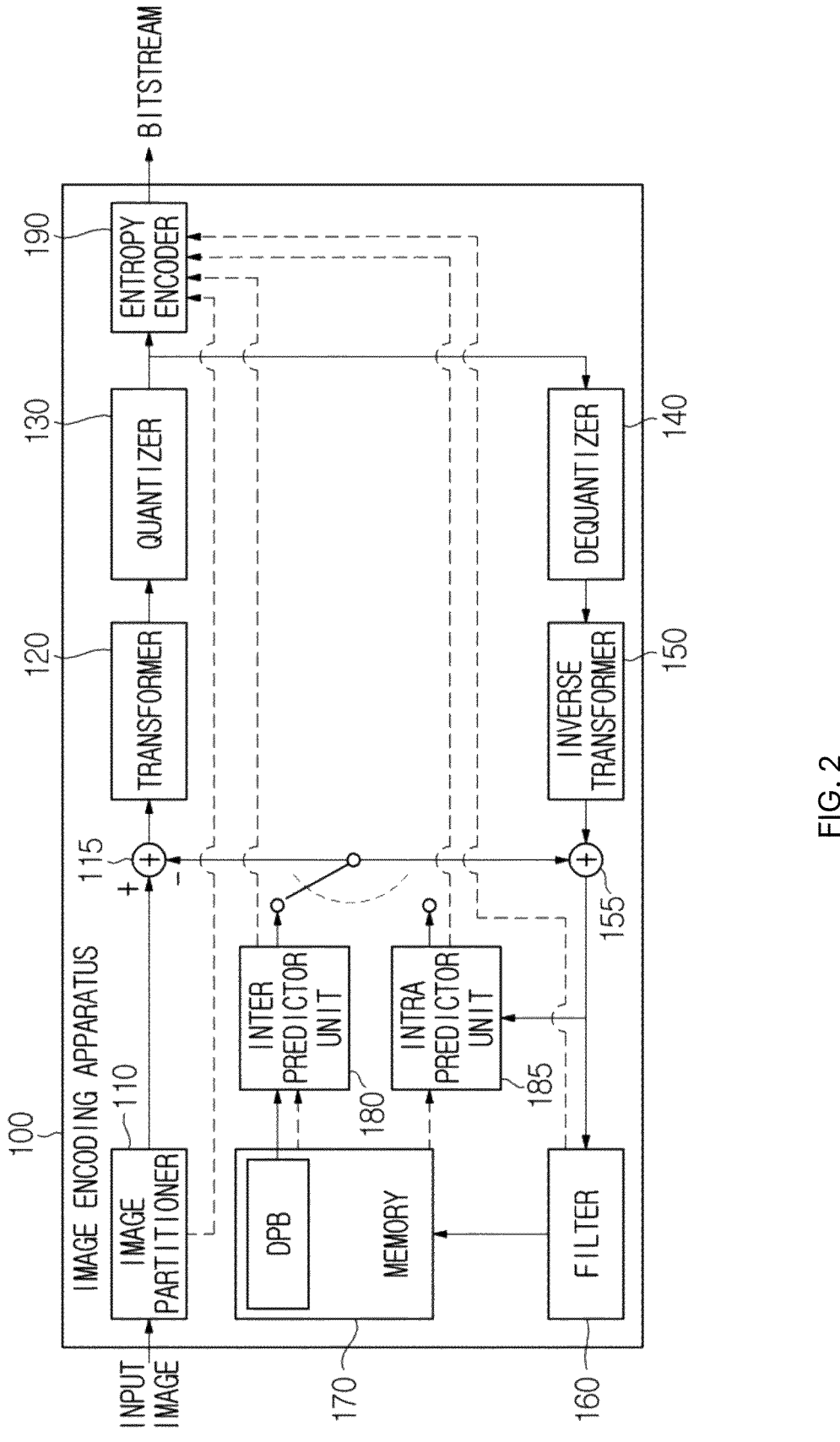
FIG. 2 is a view illustrating an example of an image encoding apparatus, to which an embodiment of the present disclosure is applicable.

As shown in FIG. 2, the image encoding apparatus 100 may include an image partitioner 110, a subtractor 115, a transformer 120, a quantizer 130, a dequantizer 140, an inverse transformer 150, an adder 155, a filter 160, a memory 170, an inter prediction unit 180, an intra prediction unit 185 and an entropy encoder 190. The inter prediction unit 180 and the intra prediction unit 185 may be collectively referred to as a "prediction unit". The transformer 120, the quantizer 130, the dequantizer 140 and the inverse transformer 150 may be included in a residual processor. The residual processor may further include the subtractor 115.

All or at least some of the plurality of components configuring the image encoding apparatus 100 may be configured by one hardware component (e.g., an encoder or a processor) in some embodiments. In addition, the memory 170 may include a decoded picture buffer (DPB) and may be configured by a digital storage medium.

The image partitioner 110 may partition an input image (or a picture or a frame) input to the image encoding apparatus 100 into one or more processing units. For example, the processing unit may be called a coding unit (CU). The coding unit may be acquired by recursively partitioning a coding tree unit (CTU) or a largest coding unit (LCU) according to a quad-tree binary-tree ternary-tree (QT/BT/TT) structure. For example, one coding unit may be partitioned into a plurality of coding units of a deeper depth based on a quad tree structure, a binary tree structure, and/or a ternary structure. For partitioning of the coding unit, a quad tree structure may be applied first, and the binary tree structure and/or ternary structure may be applied later. The coding procedure according to embodiments of the present disclosure may be performed based on the final coding unit that is no longer partitioned. The largest coding unit may be used as the final coding unit or the coding unit of deeper depth acquired by partitioning the largest coding unit may be used as the final coding unit. Here, the coding procedure may include a procedure of prediction, transform, and reconstruction. As another example, the processing unit of the coding procedure may be a prediction unit (PU) or a transform unit (TU). The prediction unit and the transform unit may be split or partitioned from the final coding unit. The prediction unit may be a unit of sample prediction, and the transform unit may be a unit for deriving a transform coefficient and/or a unit for deriving a residual signal from the transform coefficient.

The prediction unit (the inter prediction unit 180 or the intra prediction unit 185) may perform prediction on a block to be processed (current block) and generate a predicted block including prediction samples for the current block. The prediction unit may determine whether intra prediction or inter prediction is applied on a current block or CU basis. The prediction unit may generate various information related to prediction of the current block and transmit the generated information to the entropy encoder 190. The information on the prediction may be encoded in the entropy encoder 190 and output in the form of a bitstream.

The intra prediction unit (intra predictor) 185 may predict the current block by referring to the samples in the current picture. The referred samples may be located in the neighborhood of the current block or may be located apart according to the intra prediction mode and/or the intra prediction technique. The intra prediction modes may include a plurality of non-directional modes and a plurality of directional modes. The non-directional mode may include, for example, a DC mode and a planar mode. The directional mode may include, for example, 33 directional prediction modes or 65 directional prediction modes according to the degree of detail of the prediction direction. However, this is merely an example, more or less directional prediction modes may be used depending on a setting. The intra prediction unit 185 may determine the prediction mode applied to the current block by using a prediction mode applied to a neighboring block.

The inter prediction unit (inter predictor) 180 may derive a predicted block for the current block based on a reference block (reference sample array) specified by a motion vector on a reference picture. In this case, in order to reduce the amount of motion information transmitted in the inter prediction mode, the motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information.

In the case of inter prediction, the neighboring block may include a spatial neighboring block present in the current picture and a temporal neighboring block present in the reference picture. The reference picture including the reference block and the reference picture including the temporal neighboring block may be the same or different. The temporal neighboring block may be called a collocated reference block, a co-located CU (colCU), and the like. The reference picture including the temporal neighboring block may be called a collocated picture (colPic).

For example, the inter prediction unit 180 may construct a motion information candidate list based on neighboring blocks and generate information indicating which candidate is used to derive a motion vector and/or a reference picture index of the current block. Inter prediction may be performed based on various prediction modes. For example, in the case of a skip mode and a merge mode, the inter prediction unit 180 may use motion information of the neighboring block as motion information of the current block. In the case of the skip mode, unlike the merge mode, the residual signal may not be transmitted. In the case of the motion vector prediction (MVP) mode, the motion vector of the neighboring block may be used as a motion vector predictor, and the motion vector of the current block may be signaled by encoding a motion vector difference and an indicator for a motion vector predictor. The motion vector difference may mean a difference between the motion vector of the current block and the motion vector predictor.

The prediction unit may generate a prediction signal based on various prediction methods and prediction techniques described below. For example, the prediction unit may not only apply intra prediction or inter prediction but also simultaneously apply both intra prediction and inter prediction, in order to predict the current block. A prediction method of simultaneously applying both intra prediction and inter prediction for prediction of the current block may be called combined inter and intra prediction (CIIP). In addition, the prediction unit may perform intra block copy (IBC) for prediction of the current block. Intra block copy may be used for content image/video coding of a game or the like, for example, screen content coding (SCC).

IBC is a method of predicting a current picture using a previously reconstructed reference block in the current picture at a location apart from the current block by a predetermined distance. When IBC is applied, the location of the reference block in the current picture may be encoded as a vector (block vector) corresponding to the predetermined distance. IBC basically performs prediction in the current picture, but may be performed similarly to inter prediction in that a reference block is derived within the current picture. That is, IBC may use at least one of the inter prediction techniques described in the present disclosure.

The prediction signal generated by the prediction unit may be used to generate a reconstructed signal or to generate a residual signal. The subtractor 115 may generate a residual signal (residual block or residual sample array) by subtracting the prediction signal (predicted block or prediction sample array) output from the prediction unit from the input image signal (original block or original sample array). The generated residual signal may be transmitted to the transformer 120.

The transformer 120 may generate transform coefficients by applying a transform technique to the residual signal. For example, the transform technique may include at least one of a discrete cosine transform (DCT), a discrete sine transform (DST), a karhunen-loève transform (KLT), a graph-based transform (GBT), or a conditionally non-linear transform (CNT). Here, the GBT means transform obtained from a graph when relationship information between pixels is represented by the graph. The CNT refers to transform acquired based on a prediction signal generated using all previously reconstructed pixels. In addition, the transform process may be applied to square pixel blocks having the same size or may be applied to blocks having a variable size rather than square.

The quantizer 130 may quantize the transform coefficients and transmit them to the entropy encoder 190. The entropy encoder 190 may encode the quantized signal (information on the quantized transform coefficients) and output a bitstream. The information on the quantized transform coefficients may be referred to as residual information. The quantizer 130 may rearrange quantized transform coefficients in a block type into a one-dimensional vector form based on a coefficient scanning order and generate information on the quantized transform coefficients based on the quantized transform coefficients in the one-dimensional vector form.

The entropy encoder 190 may perform various encoding methods such as, for example, exponential Golomb, context-adaptive variable length coding (CAVLC), context-adaptive binary arithmetic coding (CABAC), and the like. The entropy encoder 190 may encode information necessary for video/image reconstruction other than quantized transform coefficients (e.g., values of syntax elements, etc.) together or separately. Encoded information (e.g., encoded video/image information) may be transmitted or stored in units of network abstraction layers (NALs) in the form of a bitstream. The video/image information may further include information on various parameter sets such as an adaptation parameter set (APS), a picture parameter set (PPS), a sequence parameter set (SPS), or a video parameter set (VPS). In addition, the video/image information may further include general constraint information. The signaled information, transmitted information and/or syntax elements described in the present disclosure may be encoded through the above-described encoding procedure and included in the bitstream.

The bitstream may be transmitted over a network or may be stored in a digital storage medium. The network may include a broadcasting network and/or a communication network, and the digital storage medium may include various storage media such as USB, SD, CD, DVD, Blu-ray, HDD, SSD, and the like. A transmitter (not shown) transmitting a signal output from the entropy encoder 190 and/or a storage unit (not shown) storing the signal may be included as internal/external element of the image encoding apparatus 100. Alternatively, the transmitter may be provided as the component of the entropy encoder 190.

The quantized transform coefficients output from the quantizer 130 may be used to generate a residual signal. For example, the residual signal (residual block or residual samples) may be reconstructed by applying dequantization and inverse transform to the quantized transform coefficients through the dequantizer 140 and the inverse transformer 150.

The adder 155 adds the reconstructed residual signal to the prediction signal output from the inter prediction unit 180 or the intra prediction unit 185 to generate a reconstructed signal (reconstructed picture, reconstructed block, reconstructed sample array). If there is no residual for the block to be processed, such as a case where the skip mode is applied, the predicted block may be used as the reconstructed block. The adder 155 may be called a reconstructor or a reconstructed block generator. The generated reconstructed signal may be used for intra prediction of a next block to be processed in the current picture and may be used for inter prediction of a next picture through filtering as described below.

The filter 160 may improve subjective/objective image quality by applying filtering to the reconstructed signal. For example, the filter 160 may generate a modified reconstructed picture by applying various filtering methods to the reconstructed picture and store the modified reconstructed picture in the memory 170, specifically, a DPB of the memory 170. The various filtering methods may include, for example, deblocking filtering, a sample adaptive offset, an adaptive loop filter, a bilateral filter, and the like. The filter 160 may generate various information related to filtering and transmit the generated information to the entropy encoder 190 as described later in the description of each filtering method. The information related to filtering may be encoded by the entropy encoder 190 and output in the form of a bitstream.

The modified reconstructed picture transmitted to the memory 170 may be used as the reference picture in the inter prediction unit 180. When inter prediction is applied through the image encoding apparatus 100, prediction mismatch between the image encoding apparatus 100 and the image decoding apparatus may be avoided and encoding efficiency may be improved.

The DPB of the memory 170 may store the modified reconstructed picture for use as a reference picture in the inter prediction unit 180. The memory 170 may store the motion information of the block from which the motion information in the current picture is derived (or encoded) and/or the motion information of the blocks in the picture that have already been reconstructed. The stored motion information may be transmitted to the inter prediction unit 180 and used as the motion information of the spatial neighboring block or the motion information of the temporal neighboring block. The memory 170 may store reconstructed samples of reconstructed blocks in the current picture and may transfer the reconstructed samples to the intra prediction unit 185.

An overview of an image decoding apparatus will be provided. FIG. 3 is a view schematically showing an image decoding apparatus, to which an embodiment of the present disclosure is applicable.

As shown in FIG. 3, the image decoding apparatus 200 may include an entropy decoder 210, a dequantizer 220, an inverse transformer 230, an adder 235, a filter 240, a memory 250, an inter predictor 260 and an intra prediction unit 265. The inter predictor (inter prediction unit) 260 and the intra predictor (intra prediction unit) 265 may be collectively referred to as a "prediction unit (predictor)". The dequantizer 220 and the inverse transformer 230 may be included in a residual processor.

All or at least some of a plurality of components configuring the image decoding apparatus 200 may be configured by a hardware component (e.g., a decoder or a processor) according to an embodiment. In addition, the memory 170 may include a decoded picture buffer (DPB) or may be configured by a digital storage medium.

The image decoding apparatus 200, which has received a bitstream including video/image information, may reconstruct an image by performing a process corresponding to a process performed by the image encoding apparatus 100 of FIG. 2. For example, the image decoding apparatus 200 may perform decoding using a processing unit applied in the image encoding apparatus. Thus, the processing unit of decoding may be a coding unit, for example. The coding unit may be acquired by partitioning a coding tree unit or a largest coding unit. The reconstructed image signal decoded and output through the image decoding apparatus 200 may be reproduced through a reproducing apparatus (not shown).

The image decoding apparatus 200 may receive a signal output from the image encoding apparatus of FIG. 2 in the form of a bitstream. The received signal may be decoded through the entropy decoder 210. For example, the entropy decoder 210 may parse the bitstream to derive information (e.g., video/image information) necessary for image reconstruction (or picture reconstruction). The video/image information may further include information on various parameter sets such as an adaptation parameter set (APS), a picture parameter set (PPS), a sequence parameter set (SPS), or a video parameter set (VPS).

In addition, the video/image information may further include general constraint information. The image decoding apparatus may further decode picture based on the information on the parameter set and/or the general constraint information. Signaled/received information and/or syntax elements described in the present disclosure may be decoded through the decoding procedure and obtained from the bitstream.

For example, the entropy decoder 210 decodes the information in the bitstream based on a coding method such as exponential Golomb coding, CAVLC, or CABAC, and output values of syntax elements required for image reconstruction and quantized values of transform coefficients for residual. More specifically, the CABAC entropy decoding method may receive a bin corresponding to each syntax element in the bitstream, determine a context model using a decoding target syntax element information, decoding information of a neighboring block and a decoding target block or information of a symbol/bin decoded in a previous stage, and perform arithmetic decoding on the bin by predicting a probability of occurrence of a bin according to the determined context model, and generate a symbol corresponding to the value of each syntax element.

In this case, the CABAC entropy decoding method may update the context model by using the information of the decoded symbol/bin for a context model of a next symbol/bin after determining the context model. The information related to the prediction among the information decoded by the entropy decoder 210 may be provided to the prediction unit (the inter predictor 260 and the intra prediction unit 265), and the residual value on which the entropy decoding was performed in the entropy decoder 210, that is, the quantized transform coefficients and related parameter information, may be input to the dequantizer 220. In addition, information on filtering among information decoded by the entropy decoder 210 may be provided to the filter 240. Meanwhile, a receiver (not shown) for receiving a signal output from the image encoding apparatus may be further configured as an internal/external element of the image decoding apparatus 200, or the receiver may be a component of the entropy decoder 210.

Meanwhile, the image decoding apparatus according to the present disclosure may be referred to as a video/image/picture decoding apparatus. The image decoding apparatus may be classified into an information decoder (video/image/picture information decoder) and a sample decoder (video/image/picture sample decoder). The information decoder may include the entropy decoder 210. The sample decoder may include at least one of the dequantizer 220, the inverse transformer 230, the adder 235, the filter 240, the memory 250, the inter prediction unit 160 or the intra prediction unit 265.

The dequantizer 220 may dequantize the quantized transform coefficients and output the transform coefficients. The dequantizer 220 may rearrange the quantized transform coefficients in the form of a two-dimensional block. In this case, the rearrangement may be performed based on the coefficient scanning order performed in the image encoding apparatus. The dequantizer 220 may perform dequantization on the quantized transform coefficients by using a quantization parameter (e.g., quantization step size information) and obtain transform coefficients.

The inverse transformer 230 may inversely transform the transform coefficients to obtain a residual signal (residual block, residual sample array).

The prediction unit may perform prediction on the current block and generate a predicted block including prediction samples for the current block. The prediction unit may determine whether intra prediction or inter prediction is applied to the current block based on the information on the prediction output from the entropy decoder 210 and may determine a specific intra/inter prediction mode (prediction technique).

It is the same as described in the prediction unit of the image encoding apparatus 100 that the prediction unit may generate the prediction signal based on various prediction methods (techniques) which will be described later.

The intra predictor 265 may predict the current block by referring to the samples in the current picture. The description of the intra prediction unit 185 is equally applied to the intra prediction unit 265.

The inter predictor 260 may derive a predicted block for the current block based on a reference block (reference sample array) specified by a motion vector on a reference picture. In this case, in order to reduce the amount of motion information transmitted in the inter prediction mode, motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. For example, the inter predictor 260 may configure a motion information candidate list based on neighboring blocks and derive a motion vector of the current block and/or a reference picture index based on the received candidate selection information. Inter prediction may be performed based on various prediction modes, and the information on the prediction may include information indicating a mode of inter prediction for the current block.

The adder 235 may generate a reconstructed signal (reconstructed picture, reconstructed block, reconstructed sample array) by adding the obtained residual signal to the prediction signal (predicted block, predicted sample array) output from the prediction unit (including the inter predictor 260 and/or the intra prediction unit 265). If there is no residual for the block to be processed, such as when the skip mode is applied, the predicted block may be used as the reconstructed block. The description of the adder 155 is equally applicable to the adder 235. The adder 235 may be called a reconstructor or a reconstructed block generator. The generated reconstructed signal may be used for intra prediction of a next block to be processed in the current picture and may be used for inter prediction of a next picture through filtering as described below.

The filter 240 may improve subjective/objective image quality by applying filtering to the reconstructed signal. For example, the filter 240 may generate a modified reconstructed picture by applying various filtering methods to the reconstructed picture and store the modified reconstructed picture in the memory 250, specifically, a DPB of the memory 250. The various filtering methods may include, for example, deblocking filtering, a sample adaptive offset, an adaptive loop filter, a bilateral filter, and the like.

The (modified) reconstructed picture stored in the DPB of the memory 250 may be used as a reference picture in the inter predictor 260. The memory 250 may store the motion information of the block from which the motion information in the current picture is derived (or decoded) and/or the motion information of the blocks in the picture that have already been reconstructed. The stored motion information may be transmitted to the inter predictor 260 so as to be utilized as the motion information of the spatial neighboring block or the motion information of the temporal neighboring block. The memory 250 may store reconstructed samples of reconstructed blocks in the current picture and transfer the reconstructed samples to the intra prediction unit 265.

In the present disclosure, the embodiments described in the filter 160, the inter prediction unit 180, and the intra prediction unit 185 of the image encoding apparatus 100 may be equally or correspondingly applied to the filter 240, the inter predictor 260, and the intra predictor 265 of the image decoding apparatus 200.

Figure 4:
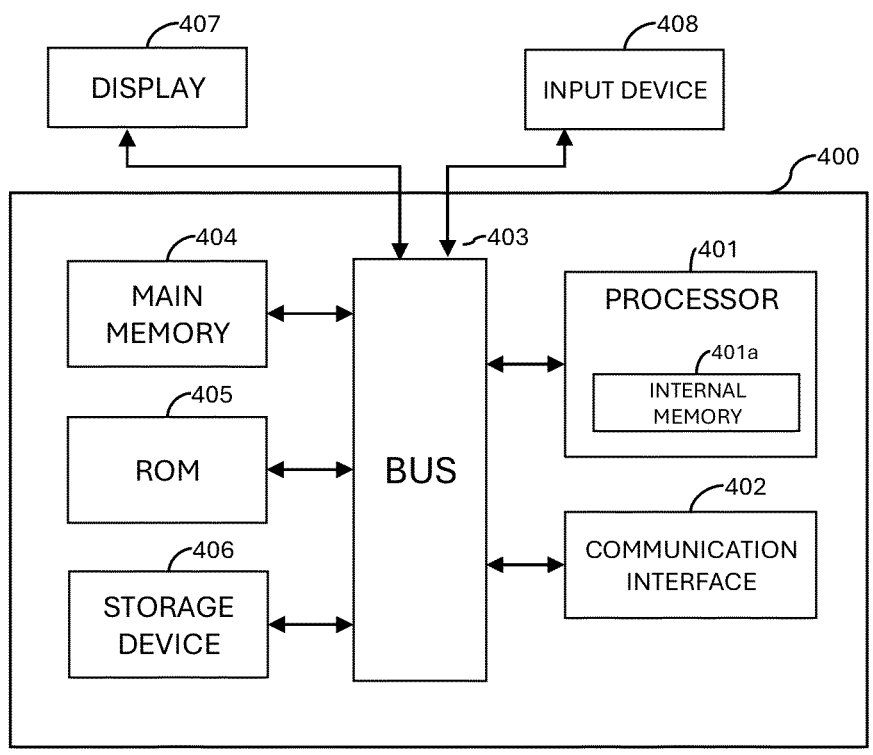
FIG. 4 is a view illustrating an example of a computer device, to which an embodiment of the present disclosure is applicable.

Referring now to FIG. 4, an illustration of an example computer 400 is provided which may be used to embody, implement, execute, or perform embodiments of the present disclosure. In selected embodiments, the computer 400 may include a bus 403 (or multiple buses) or other communication mechanism, a processor 401, processor internal memory 401a, main memory 404, read only memory (ROM) 405, one or more additional storage devices 406, and/or a communication interface 402, or the like or sub-combinations thereof. The embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. In all embodiments, the various components described herein may be implemented as a single component, or alternatively may be implemented in various separate components.

A bus 403 or other communication mechanism, including multiple such buses or mechanisms, may support communication of information within the computer 400. The processor 401 may be connected to the bus 403 and process information. In selected embodiments, the processor 401 may be a specialized or dedicated microprocessor configured to perform particular tasks in accordance with the features and aspects disclosed herein by executing machine-readable software code defining the particular tasks. In some embodiments, multiple processors 401 may be provided with each processing unit dedicated to a particular specialized task, such as graphics processing or artificial intelligence related processing.

Main memory 404 (e.g., random access memory—or RAM—or other dynamic storage device) may be connected to the bus 403 and store information and instructions to be executed by the processor 401. Processor 401 may also include internal memory 401a, such as CPU cache implemented by SRAM, for storing data used for executing instructions. Utilization of internal memory 401a may optimize data and memory management by reducing memory bandwidth usage with main memory 404. Although FIG. 4 depicts internal memory 401a as a component of processor 401, it will be understood that embodiments are included wherein internal memory 401a is a separate component apart from processor 401. Main memory 404 may also store temporary variables or other intermediate information during execution of such instructions.

ROM 405 or some other static storage device may be connected to a bus 403 and store static information and instructions for the processor 401. An additional storage device 406 (e.g., a magnetic disk, optical disk, memory card, or the like) may be connected to the bus 403. The main memory 404, ROM 405, and the additional storage device 406 may include a non-transitory computer-readable medium holding information, instructions, or some combination thereof, for example instructions that when executed by the processor 401, cause the computer 400 to perform one or more operations of a method as described herein.

A communication interface 402 may also be connected to the bus 403. A communication interface 402 may provide or support two-way data communication between a computer 400 and one or more external devices (e.g., other devices contained within the computing environment).

In selected embodiments, the computer 400 may be connected (e.g., via a bus) to a display 407. The display 407 may use any suitable mechanism to communicate information to a user of a computer 400. For example, the display 407 may include or utilize a liquid crystal display (LCD), light emitting diode (LED) display, projector, or other display device to present information to a user of the computer 400 in a visual display. One or more input devices 408 (e.g., an alphanumeric keyboard, mouse, microphone, stylus pen) may be connected to the bus 403 to communicate information and commands to the computer 400. In selected embodiments, one input device 408 may provide or support control over the positioning of a cursor to allow for selection and execution of various objects, files, programs, and the like provided by the computer 400 and displayed by the display 407.

The computer 400 may be used to transmit, receive, encode, decode, display, or perform other processes for one or more image or video files. In selected embodiments, such transmitting, receiving, encoding, decoding, displaying, and the like may be in response to the processor 401 executing one or more sequences of one or more instructions contained in main memory 404. Such instructions may be read into main memory 404 from another non-transitory computer-readable medium (e.g., a storage device).

Execution of sequences of instructions contained in main memory 404 may cause the processor 401 to perform one or more of the procedures or steps described herein. In selected embodiments, one or more processors in a multi-processing arrangement may also be employed to execute sequences of instructions contained in main memory 404. Alternatively, or in addition thereto, firmware may be used in place of, or in connection with, software instructions to implement procedures or steps in accordance with the features and aspects disclosed herein. Thus, embodiments in accordance with the features and aspects disclosed herein may not be limited to any specific combination of hardware circuitry and software.

Non-transitory computer readable medium may refer to any medium that participates in holding instructions for execution by the processor 401, or that stores data for processing by a computer, and comprise all computer-readable media, with the sole exception being a transitory, propagating signal. Such a non-transitory computer readable medium may include, but is not limited to, non-volatile media, volatile media, and temporary storage media (e.g., cache memory). Non-volatile media may include optical or magnetic disks, such as an additional storage device. Volatile media may include dynamic memory, such as main memory. Common forms of non-transitory computer-readable media may include, for example, a hard disk, a floppy disk, magnetic tape, or any other magnetic medium, a CD-ROM, DVD, Blu-ray or other optical medium, RAM, PROM, EPROM, FLASH-EPROM, any other memory card, chip, or cartridge, or any other memory medium from which a computer can read.

In selected embodiments, a communication interface 402 may provide or support external, two-way data communication to or via a network link. For example, a communication interface 402 may be a wireless network interface controller or a cellular radio providing a data communication network connection. Alternatively, a communication interface 402 may comprise a local area network (LAN) card providing a data communication connection to a compatible LAN. In any such embodiment, a communication interface 402 may send and receive electrical, electromagnetic, or optical signals conveying information.

A network link may provide data communication through one or more networks to other data devices (e.g., other computers such as 400, or terminals of various other types). For example, a network link may provide a connection through a local network of a host computer or to data equipment operated by an Internet Service Provider (ISP). An ISP may, in turn, provide data communication services through the Internet. Accordingly, a computer 400 may send and receive commands, data, or combinations thereof, including program code, through one or more networks, a network link, and communication interface 402. Thus, the computer 400 may interface or otherwise communicate with a remote server, or some combination thereof.

The various devices, modules, terminals, and the like discussed herein may be implemented on a computer by execution of software comprising machine instructions read from computer-readable medium, as discussed above. In certain embodiments, several hardware aspects may be implemented using a single computer, in other embodiments multiple computers, input/output systems and hardware may be used to implement the system.

For a software implementation, certain embodiments described herein may be implemented with separate software modules, such as procedures and functions, each of which perform one or more of the functions and operations described herein. The software codes can be implemented with a software application written in any suitable programming language and may be stored in memory and executed by a controller or processor.

The content streaming system to which the embodiment(s) of this document are applied may largely include an encoding server, a streaming server, a web server, a media storage, a user device, and a multimedia input device.

The encoding server compresses content input from multimedia input devices such as smartphones, cameras, camcorders, etc. into digital data, generates a bitstream, and transmits it to the streaming server. As another example, when multimedia input devices such as smartphones, cameras, camcorders, etc. directly generate bitstreams, the encoding server may be omitted.

The bitstream may be generated by an encoding method or a bitstream generation method to which the embodiment(s) of this document is applied, and the streaming server may temporarily store the bitstream in the process of transmitting or receiving the bitstream. You can.

The streaming server transmits multimedia data to the user device based on user requests through a web server, and the web server serves as a medium to inform the user of what services are available. When a user requests a desired service from the web server, the web server delivers it to a streaming server, and the streaming server transmits multimedia data to the user. At this time, the content streaming system may include a separate control server, and in this case, the control server serves to control commands/responses between each device in the content streaming system.

The streaming server may receive content from a media repository and/or encoding server. For example, when receiving content from the encoding server, the content can be received in real time. In this case, in order to provide a smooth streaming service, the streaming server may store the bitstream for a certain period of time.

Examples of the user device include mobile phones, smart phones, laptop computers, digital broadcasting terminals, personal digital assistants (PDAs), portable multimedia players (PMPs), navigation, slate PCs, Tablet PC, ultrabook, wearable device (e.g. smartwatch, smart glass, head mounted display), digital TV, desktop There may be computers, digital signage, etc.

Each server in the content streaming system may be operated as a distributed server, and in this case, data received from each server may be distributedly processed.

A discussion of neural-network prost-filter group characteristic (NNPFGC) and neural-network prost-filter group activation (NNPFGA) SEI messages will now be provided as context for discussion of embodiments of the present disclosure.

Neural-Network Post-Filter Characteristics (NNPFC)

A combinations of Tables 1 to 3 represent an example of NNPFC syntax structure.

TABLE 1

|  | Descriptor |
| --- | --- |
| nn_post_filter_characteristics( payloadSize ) { |  |
| nnpfc_purpose | u(16) |
| nnpfc_id | ue(v) |
| nnpfc_base_flag | u(1) |
| nnpfc_mode_idc | ue(v) |
| if( nnpfc_mode_idc = = 1 ) { |  |
| while( !byte_aligned( ) ) |  |
| nnpfc_reserved_zero_bit_a | u(1) |
| nnpfc_tag_uri | st(v) |
| nnpfc_uri | st(v) |
| } |  |
| nnpfc_property_present_flag | u(1) |
| if( nnpfc_property_present_flag ) { |  |
| /* input and output formatting */ |  |
| nnpfc_num_input_pics_minus1 | ue(v) |
| if( nnpfc_num_input_pics_minus1 > 0 ) { |  |
| for( i = 0; i <= nnpfc_num_input pics minus1; i++ ) |  |
| nnpfc_input_pic_output_flag[ i ] | u(1) |
| nnpfc_absent_input_pic_zero_flag | u(1) |
| } |  |
| if( chromaUpsamplingFlag ) |  |
| nnpfc_out_sub_c_flag | u(1) |
| if( colourizationFlag ) |  |
| nnpfc_out colour_format_idc | u(2) |
| if( resolutionResamplingFlag ) { |  |
| nnpfc_pic_width_num_minus1 | ue(v) |
| nnpfc_pic_width_denom_minus1 | ue(v) |
| nnpfc_pic_height_num_minus1 | ue(v) |
| nnpfc_pic_height_denom_minus1 | ue(v) |
| } |  |
| if( pictureRateUpsamplingFlag ) |  |
| for( i = 0; i < nnpfc_num_input_pics_minus1; i++ ) |  |
| nnpfc_interpolated_pics[ i ] | ue(v) |
| nnpfc_component_last_flag | u(1) |
| nnpfc_inp_format_idc | ue(v) |
| nnpfc_auxiliary_inp_idc | ue(v) |

TABLE 2

| nnpfc_inp_order_idc | ue(v) |
| --- | --- |
| if( nnpfc_inp_format_idc = = 1 ) { |  |
| if( nnpfc_inp_order_idc != 1 ) |  |
| nnpfc_inp_tensor_luma_bitdepth_minus8 | ue(v) |
| if( npfc_inp_order_idc != 0 ) |  |
| nnpfc_inp_tensor_chroma_bitdepth_minus8 | ue(v) |
| } |  |
| nnpfc_out_format_idc | ue(v) |

TABLE 2-continued

| nnpfc_out_order_idc | ue(v) |
| --- | --- |
| if( nnpfc_out_format_idc = = 1 ) { |  |
| if( nnpfc_out_order_idc != 1 ) |  |
| nnpfc_out_tensor_luma_bitdepth_minus8 | ue(v) |
| if( nnpfc_out_order_idc != 0 ) |  |
| nnpfc_out_tensor_chroma_bitdepth_minus8 | ue(v) |
| } |  |
| nnpfc_separate_colour_description_present_flag | u(1) |
| if( nnpfc_separate_colour_description_present_flag ) { |  |
| nnpfc_colour_primaries | u(8) |
| nnpfc_transfer_characteristics | u(8) |
| if( nnpfc_out_format_idc = = 1 ) { |  |
| nnpfc_matrix_coeffs | u(8) |
| nnpfc_full_range_flag | u(1) |
| } |  |
| } |  |
| nnpfc_chroma_loc_info_present_flag | u(1) |
| if( nnpfc_chroma_loc_info_present_flag ) |  |
| nnpfc_chroma_sample_loc_type_frame | ue(v) |
| nnpfc_overlap | ue(v) |
| nnpfc_constant_patch_size_flag | u(1) |
| if( nnpfc_constant_patch_size_flag ) { |  |
| nnpfc_patch_width_minus1 | ue(v) |
| nnpfc_patch_height_minus1 | ue(v) |
| } else { |  |
| nnpfc_extended_patch_width_cd_delta_minus1 | ue(v) |
| nnpfc_extended_patch_height_cd_delta_minus1 | ue(v) |
| } |  |

TABLE 3

| nnpfc_padding_type | ue(v) |
| --- | --- |
| if( nnpfc_padding_type = = 4 ) { |  |
| if( nnpfc_inp_order_idc != 1 ) |  |
| nnpfc_luma_padding_val | ue(v) |
| if(nnpfc_inp_order_idc != 0 ) { |  |
| nnpfc_cb_padding_val | ue(v) |
| nnpfc_cr_padding_val | ue(v) |
| } |  |
| } |  |
| nnpfc_complexity_info_present_flag | u(1) |
| if( nnpfc_complexity_info present_flag ) { |  |
| nnpfc_parameter_type_idc | u(2) |
| if( nnpfc_parameter_type_idc != 2 ) |  |
| nnpfc_log2_parameter_bit_length_minus3 | u(2) |
| nnpfc_num_parameters_idc | u(6) |
| nnpfc_num_kmac_operations_idc | ue(v) |
| nnpfc_total_kilobyte_size | ue(v) |
| } |  |
| nnpfc_metadata_extension_num_bits | ue(v) |
| if( nnpfc_metadata_extension_num_bits > 0 ) |  |
| nnpfc_reserved_metadata_extension | u(v) |
| } |  |
| /* ISO/IEC 15938-17 bitstream */ |  |
| if( nnpfc_mode_idc = = 0 ) { |  |
| while( !byte_aligned( ) ) |  |
| nnpfc_reserved_zero_bit_b | u(1) |
| for( i = 0; more_data_in_payload( ); i++ ) |  |
| nnpfc_payload_byte[ i ] | b(8) |
| } |  |
| } |  |

The NNPFC syntax structures of Tables 1 to 3 may be signaled in the form of a supplemental enhancement information (SEI) message. An SEI message signaling the NNPFC syntax structures of Tables 1 to 3 may be referred to as an NNPFC SEI message.

The neural-network post-filter characteristics (NNPFC) SEI message specifies a neural network that may be used as a post-processing filter. The use of specified neural-network post-processing filters (NNPFs) for specific pictures is indicated with neural-network post-filter activation (NNPFA) SEI messages. Here, "post-processing filter" and "post filter" may have the same meaning.

Use of this SEI message requires the definition of the following variables:

Input picture width and height in units of luma samples, denoted herein by CroppedWidth and CroppedHeight, respectively.

Luma sample array CroppedYPic[idx] and chroma arrays CroppedCbPic[idx] and CroppedCrPic[idx], when present, of the input pictures with index idx in the range of 0 to numInputPics−1, inclusive, that are used as input for the NNPF.

$BitDepth_Y$ may represent a bit depth for the luma sample array of the input pictures.

$BitDepth_C$ may represent a bit depth for the chroma sample arrays, if any, of the input pictures.

ChromaFormatIdc may represent a chroma format identifier.

When nnpfc_auxiliary_inp_idc is equal to 1, a filtering strength control value array StrengthControlVal[idx] that shall contain real numbers in the range of 0 to 1, inclusive, of the input pictures with index idx in the range of 0 to numInputPics−1, inclusive.

Input picture with index 0 may correspond to the picture for which the NNPF defined by this NNPFC SEI message is activated by an NNPFA SEI message. Input picture with index i in the range of 1 to numInputPics−1, inclusive, may precede the input picture with index i−1 in output order.

nnpfc_purpose indicates the purpose of the NNPF as specified in Table 4. In Table 4, (nnpfc_purpose & bitMask) not equal to 0 may indicates that the NNPF of Table 4 has the purpose associated with the bitMask value.

When nnpfc_purpose is greater than 0 and (nnpfc_purpose & bitMask) is equal to 0, the purpose associated with the bitMask value is not applicable to the NNPF.

When nnpfc_pupose is equal to 0, the NNPF may be used as determined by the application.

The value of nnpfc_purpose shall be in the range of 0 to 63, inclusive, in bitstreams. Values of 64 to 65 535, inclusive, for nnpfc_purpose may be reserved for future use. Decoders may ignore NNPFC SEI messages with nnpfc_purpose in the range of 64 to 65 535, inclusive, for such configurations.

TABLE 4

| bitMask | Interpretation |
| --- | --- |
| 0x01 | General visual quality improvement |
| 0x02 | Chroma upsampling (from the 4:2:0 chroma format to the 4:2:2 or 4:4:4 chroma format, or from the 4:2:2 chroma format to the 4:4:4 chroma format) |
| 0x04 | Resolution resampling (increasing or decreasing the width or height) |
| 0x08 | Picture rate upsampling |
| 0x10 | Bit depth upsampling (increasing the luma bit depth or the chroma bit depth) |
| 0x20 | Colourization |

A variable chromaUpsamplingFlag specifying whether nnpfc_purpose indicates the purpose of the NNPF to include chroma upsampling, a variable resolutionResamplingFlag specifying whether nnpfc_purpose indicates the purpose of the NNPF to include resolution resampling, a variable pictureRateUpsamplingFlag specifying whether nnpfc_purpose indicates the purpose of the NNPF to include picture rate upsampling, a variable bitDepthUpsamplingFlag indicating the purpose of the NNPF to include bit depth upsampling, and a variable colourizationFlag specifying the purpose of the NNPF to include colourization, are derived as shown in Table 5 below.

TABLE 5 chromaUpsamplingFlag = ( ( nnpfc_purpose & 0x02 ) > 0 ) ? 1 : 0
resolutionResamplingFlag = ( ( nnpfc_purpose & 0x04 ) > 0 ) ? 1 : 0
pictureRateUpsamplingFlag = ( ( nnpfc_purpose & 0x08 ) > 0 ) ? 1 : 0
bitDepthUpsamplingFlag = ( ( nnpfc_purpose & 0x10 ) > 0 ) ? 1 : 0
colourizationFlag = ( ( nnpfc_purpose & 0x20 ) > 0 ) ? 1 : 0

When ChromaFormatIdc is equal to 3, chromaUpsamplingFlag shall be equal to 0. When ChromaFormatIdc or chromaUpsamplingFlag is not equal to 0, colourizationFlag shall be equal to 0. When pictureRateUpsamplingFlag is equal to 1 and the input picture with index 0 is associated with a frame packing arrangement SEI message with fp_arrangement_type equal to 5, all input pictures may be associated with a frame packing arrangement SEI message with fp_arrangement_type equal to 5 and the same value of fp_current_frame_is_frame0_flag.

nnpfc_id may contain an identifying number that may be used to identify an NNPF. The value of nnpfc_id shall be in the range of 0 to $2^{32}$-2, inclusive. Values of nnpfc_id from 256 to 511, inclusive, and from $2^{31}$ to $2^{32}$-2, inclusive, may be reserved for future use. Decoders encountering an NNPFC SEI message with nnpfc_id in the range of 256 to 511, inclusive, or in the range of $2^{31}$ to $2^{32}$-2, inclusive, may ignore the SEI message for such configurations.

When an NNPFC SEI message is the first NNPFC SEI message, in decoding order, that has a particular nnpfc_id value within the current CLVS, the following applies:

This SEI message specifies a base NNPF.

This SEI message pertains to the current decoded picture and all subsequent decoded pictures of the current layer, in output order, until the end of the current CLVS.

The NNPFC SEI message may be a repetition of a previous NNPFC SEI message within the current CLVS in decoding order, and subsequent semantics may apply as if this SEI message were the only NNPFC SEI message with identical content within the current CLVS.

nnpfc_mode_idc equal to 0 may indicate that the SEI message may contain a bitstream representing the base NNPF, or may represent an update relative to the base NNPF with the same nnpfc_id value.

When the NNPFC SEI message is the first NNPFC SEI message, in decoding order, that has a particular nnpfc_id value within the current CLVS, nnpfc_mode_idc equal to 1 may specify that the base NNPF associated with the nnpfc_id value is a neural network, and the neural network may be a neural network identified by a URI denoted by nnpfc_uri using a format identified by a tag URI nnpfc_tag_uri.

If the NNPFC SEI message is neither the first NNPFC SEI message, in decoding order, that has a particular nnpfc_id value within the current CLVS nor a repetition of the first NNPFC SEI message, nnpfc_mode_idc equal to 1 may specify that an update relative to the base NNPF with the same nnpfc_id value are defined by a URI denoted by nnpfc_uri using a format identified by a tag URI nnpfc_tag_uri.

nnpfc_base_flag equal to 1 may specify that the SEI message specifies the base NNPF. nnpf_base_flag equal to 0 may specify that the SEI message specifies an update relative to the base NNPF.

The following constraints apply to the value of nnpfc_base_flag:

When an NNPFC SEI message is the first NNPFC SEI message, in decoding order, that has a particular nnpfc_id value within the current CLVS, the value of nnpfc_base_flag shall be equal to 1.

When an NNPFC SEI message nnpfcB is not the first NNPFC SEI message, in decoding order, that has a particular nnpfc_id value within the current CLVS and the value of nnpfc_base_flag is equal to 1, the NNPFC SEI message shall be a repetition of the first NNPFC SEI message nnpfcA with the same nnpfc_id value, in decoding order, i.e., the payload content of nnpfcB shall be the same as that of nnpfcA.

When nnpfc_base_flag is equal to 0, the following applies:

This SEI message defines an update relative to the preceding base NNPF in decoding order with the same nnpfc_id value. Updates are not cumulative but rather each update is applied on the base NNPF, which is the NNPF specified by the first NNPFC SEI message, in decoding order, that has a particular nnpfc_id value within the current CLVS. The NNPF defined by this SEI message may be obtained by applying the update defined by this SEI message relative to the base NNPF with the same nnpfc_id value.

This SEI message pertains to the current decoded picture and all subsequent decoded pictures of the current layer, in output order, until the end of the current CLVS. Herein, the decoded picture that follows the current decoded picture in output order within the current CLVS may be excluded. This SEI message is associated with a subsequent NNPFC SEI message, in decoding order, having nnpfc_base_flag equal to 0 and that particular nnpfc_id value within the current CLVS, whichever is earlier.

nnpfc_mode_idc equal to 0 may indicate that this SEI message contains a bitstream that specifies a base NNPF (when nnpfc_base_flag is equal to 1) or is an update relative to the base NNPF with the same nnpfc_id value (when nnpfc_base_flag is equal to 0). When nnpfc_base_flag is equal to 1, nnpfc_mode_idc equal to 1 may specify that the base NNPF associated with the nnpfc_id value is a neural network identified by the URI. Herein, the URI may be indicated by nnpfc_uri with the format identified by the tag URI nnpfc_tag_uri. When nnpfc_base_flag is equal to 0, nnpfc_mode_idc equal to 1 may specify that an update relative to the base NNPF with the same nnpfc_id value is defined by the URI. Herein, the URI may be indicated by nnpfc_uri with the format identified by the tag URI nnpfc_tag_uri.

The value of nnpfc_mode_idc shall be in the range of 0 to 1, inclusive, in bitstreams. Values of 2 to 255, inclusive, for nnpfc_mode_idc may reserved for future use and shall not be present in bitstreams. Decoders may ignore NNPFC SEI messages with nnpfc_mode_idc in the range of 2 to 255, inclusive, in such configurations. Values of nnpfc_mode_idc greater than 255 shall not be present in bitstreams and may not be reserved for future use.

nnpfc_reserved_zero_bit_a shall be equal to 0 in bitstreams. Decoders shall ignore NNPFC SEI messages in which nnpfc_reserved_zero_bit_a is not equal to 0.

nnpfc_tag_uri may contain a tag URI with syntax and semantics as specified in IETF RFC 4151 identifying the neural network used as a base NNPF or an update relative to the base NNPF with the same nnpfc_id value specified by nnpfc_uri. nnpfc_tag_uri enables uniquely identifying the format of neural network data specified by nnrpf_uri without needing a central registration authority. nnpfc_tag_uri equal to "tag: iso.org,2023:15938-17" may indicate that the neural network data identified by nnpfc_uri conforms to ISO/IEC 15938-17.

nnpfc_uri may contain a URI with syntax and semantics as specified in IETF Internet Standard 66 identifying the neural network used as a base NNPF or an update relative to the base NNPF with the same nnpfc_id value.

nnpfc_property_present_flag equal to 1 may specify that syntax elements related to the filter purpose, input formatting, output formatting, and complexity are present. nnpfc_property_present_flag equal to 0 may specify that no syntax elements related to the filter purpose, input formatting, output formatting, and complexity are present. When nnpfc_base_flag is equal to 1, nnpfc_property_present_flag shall be equal to 1. When nnpfc_property_present_flag is equal to 0, the values of all syntax elements that may be present only when nnpfc_property_present_flag is equal to 1 may be inferred to be equal to their corresponding syntax elements, respectively, in the NNPFC SEI message that contains the base NNPF for which this SEI message provides an update.

When an NNPFC SEI message nnpfcCurr is not the first NNPFC SEI message, in decoding order, that has a particular nnpfc_id value within the current CLVS, is not a repetition of the first NNPFC SEI message with that particular nnpfc_id (i.e., the value of nnpfc_base_flag is equal to 0), and the value of nnpfc_property_present_flag is equal to 1, the following constraints apply:

The value of nnpfc_purpose in the NNPFC SEI message shall be the same as the value of nnpfc_purpose in the first NNPFC SEI message, in decoding order, that has that particular nnpfc_id value within the current CLVS.

The values of syntax elements following nnpfc_property_present_flag and preceding nnpfc_complexity_info_present_flag, in decoding order, in the NNPFC SEI message shall be the same as the values of corresponding syntax elements in the first NNPFC SEI message, in decoding order, that has that particular nnpfc_id value within the current CLVS.

Either nnpfc_complexity_info_present_flag shall be equal to 0 or both nnpfc_complexity_info_present_flag shall be equal to 1 in the first NNPFC SEI message, in decoding order, that has that particular nnpfc_id value within the current CLVS and all the following apply:

(1) nnpfc_parameter_type_idc in nnpfcCurr shall be equal to nnpfc_parameter_type_idc in nnpfcBase.

(2) nnpfc_log 2_parameter_bit_length_minus3 in nnpfcCurr, when present, shall be less than or equal to nnpfc_log 2_parameter_bit_length_minus3 in nnpfcBase.

(3) If nnpfc_num_parameters_idc in nnpfcBase is equal to 0, nnpfc_num_parameters_idc in nnpfcCurr shall be equal to 0.

(4) Otherwise (nnpfc_num_parameters_idc in nnpfcBase is greater than 0), nnpfc_num_parameters_idc in nnpfcCurr shall be greater than 0 and less than or equal to nnpfc_num_parameters_idc in nnpfcBase.

(5) If nnpfc_num_kmac_operations_idc in nnpfcBase is equal to 0, nnpfc_num_kmac_operations_idc in nnpfcCurr shall be equal to 0.

(6) Otherwise (nnpfc_num_kmac_operations_idc in nnpfcBase is greater than 0), nnpfc_num_kmac_operations_idc in nnpfcCurr shall be greater than 0 and less than or equal to nnpfc_num_kmac_operations_idc in nnpfcBase.

(7) If nnpfc_total_kilobyte_size in nnpfcBase is equal to 0, nnpfc_total_kilobyte_size in nnpfcCurr shall be equal to 0.

(8) Otherwise (nnpfc_total_kilobyte_size in nnpfcBase is greater than 0), nnpfc_total_kilobyte_size in nnpfcCurr shall be greater than 0 and less than or equal to nnpfc_total_kilobyte_size in nnpfcBase.

nnpfc_num_input_pics_minus1+1 may specify the number of pictures used as input for the NNPF. The value of nnpfc_num_input_pics_minus1 shall be in the range of 0 to 63, inclusive. When pictureRateUpsamplingFlag is equal to 1, the value of nnpfc_num_input_pics_minus1 shall be greater than 0.

The variable numInputPics, specifying the number of pictures used as input for the NNPF, may be derived as follows:

$$numInputPics = \text{nnpfc\_num\_input\_pics\_minus1} + 1 \quad \text{[Equation 1]}$$

nnpfc_input_pic_output_flag[i] equal to 1 may indicate that for the i-th input picture the NNPF generates a corresponding output picture. nnpfc_input_pic_output_flag[i] equal to 0 may indicate that for the i-th input picture the NNPF does not generate a corresponding output picture. When nnpfc_num_input_pics_minus1 is equal to 0, nnpfc_input_pic_output_flag[0] is inferred to be equal to 1. When pictureRateUpsamplingFlag is equal to 0 and nnpfc_num_input_pics_minus1 is greater than 0, nnpfc_input_pic_output_flag[i] shall be equal to 1 for at least one value of i in the range of 0 to nnpfc_num_input_pics_minus1, inclusive. nnpfc_input_pic_output_flag[i] may be referred to as nnpfc_input_pic_filtering_flag[i].

nnpfc_absent_input_pic_zero_flag equal to 1 may indicate that the NNPF expects an input picture that is not present in the bitstream to be represented by sample arrays with sample values equal to 0. nnpfc_absent_input_pic_flag equal to 0 may indicate that the NNPF expects an input picture that is not present in the bitstream to be represented by the closest input picture in output order within the bitstream.

nnpfc_out_sub_c_flag may specify the values of the variables outSubWidthC and outSubHeightC when chromaUpsamplingFlag is equal to 1. nnpfc_out_sub_c_flag equal to 1 may specify that outSubWidthC is equal to 1 and outSubHeightC is equal to 1. nnpfc_out_sub_c_flag equal to 0 may specify that outSubWidthC is equal to 2 and outSubHeightC is equal to 1. When ChromaFormatIdc is equal to 2 and nnpfc_out_sub_c_flag is present, the value of nnpfc_out_sub_c_flag shall be equal to 1.

nnpfc_out_colour_format_idc, when colourizationFlag is equal to 1, may specify the colour format of the NNPF output and consequently the values of the variables outSubWidthC and outSubHeightC. nnpfc_out_colour_format_idc equal to 1 may specify that the colour format of the NNPF output is the 4:2:0 format and outSubWidthC and outSubHeightC are both equal to 2. nnpfc_out_colour_format_idc equal to 2 may specify that the colour format of the NNPF output is the 4:2:2 format and outSubWidthC is equal to 2 and outSubHeightC is equal to 1. nnpfc_out_colour_format_idc equal to 3 may specify that the colour format of the NNPF output is the 4:4:4 format and outSubWidthC and outSubHeightC are both equal to 1. The value of nnpfc_out_colour_format_idc shall not be equal to 0. When chromaUpsamplingFlag and colourizationFlag are both equal to 0, outSubWidthC and outSubHeightC may be inferred to be equal to SubWidthC and SubHeightC, respectively.

nnpfc_pic_width_num_minus1+1 and nnpfc_pic_width_denom_minus1+1 may specify the numerator and denominator, respectively, for the resampling ratio of the NNPF output picture width relative to CroppedWidth. The value of (nnpfc_pic_width_num_minus1+1)÷(nnpfc_pic_width_denom_minus1+1) shall be in the range of 1÷16 to 16, inclusive. When nnpfc_pic_width_num_minus1 and nnpfc_pic_width_denom_minus1 are not present, the values of nnpfc_pic_width_num_minus1 and nnpfc_pic_width_denom_minus1 may be both inferred to be equal to 0.

The variable nnpfcOutputPicWidth, representing the width of the luma sample arrays of the picture(s) resulting from applying the NNPF identified by nnpfc_id to the input picture(s), may be derived as follows:

$$nnpfcOutputPicWidth = \quad \text{[Equation 2]}$$
$$\text{Ceil}(CroppedWidth * (\text{nnpfc\_pic\_width\_num\_minus1} + 1) \div$$
$$(\text{nnpfc\_pic\_width\_denom\_minus1} + 1))$$

The remainder of nnpfcOutputPicWidth divided by outSubWidthC shall be 0. nnpfc_pic_height_num_minus1+1 and nnpfc_pic_height_denom_minus1+1 may specify the numerator and denominator, respectively, for the resampling ratio of the NNPF output picture height relative to CroppedHeight. The value of (nnpfc_pic_height_num_minus1+1)÷(nnpfc_pic_height_denom_minus1+1) shall be in the range of 1-16 to 16, inclusive. When nnpfc_pic_height_num_minus1 and nnpfc_pic_height_denom_minus1 are not present, the values of nnpfc_pic_height_num_minus1 and nnpfc_pic_height_denom_minus1 may be both inferred to be equal to 0.

The variable nnpfcOutputPicHeight, representing the height of the luma sample arrays of the picture(s) resulting from applying the NNPF identified by nnpfc_id to the input picture(s), may be derived as follows:

$$nnpfcOutputPicHeight = \quad \text{[Equation 3]}$$
$$\text{Ceil}(CroppedHeight * (\text{nnpfc\_pic\_height\_num\_minus1} + 1) \div$$
$$(\text{nnpfc\_pic\_height\_denom\_minus1} + 1))$$

The remainder of nnpfcOutputPicHeight divided by outSubHeightC shall be equal to 0.

When nnpfc_pic_width_num_minus1, nnpfc_pic_width_denom_minus1, nnpfc_pic_height_num_minus1, and nnpfc_pic_height_denom_minus1 are present, at least one of the following shall be true:

The value of nnpfcOutputPicWidth is not equal to CroppedWidth.

The value of nnpfcOutputPicHeight is not equal to CroppedHeight. nnpfc_interpolated_pics[i] may specify the number of interpolated pictures generated by the NNPF between the i-th and the (i+1)-th picture used as input for the NNPF. The value of nnpfc_interpolated_pics[i] shall be in the range of 0 to 63, inclusive. The value of nnpfc_interpolated_pics[i] shall be greater than 0 for at least one value of i in the range of 0 to nnpfc_num_input_pics_minus1-1, inclusive.

The variables NumInpPicsInOutputTensor, specifying the number of pictures that have a corresponding input picture and are present in the output tensor of the NNPF, InpIdx[idx] specifying the input picture index of the idx-th picture that When nnpfc_inp_format_idc is equal to 1, the input values to the NNPF are unsigned integer numbers and the functions InpY( ) and InpC( ) are specified as shown in Table 7.

TABLE 7

$$
\begin{aligned}
&\text{shiftY} = \text{BitDepth}_Y - \text{inpTensorBitDepth}_Y \\
&\text{if( inpTensorBitDepth}_Y \text{ >= BitDepth}_Y) \\
&\quad \text{InpY( x ) = x << ( inpTensorBitDepth}_Y - \text{BitDepth}_Y ) \\
&\text{else} \\
&\quad \text{InpY( x ) = Chip3(0,( 1 << impTensorBitDepth}_Y ) - 1, ( x + ( 1 << ( \text{shiftY} - 1 ) ) ) ) >> \text{shiftY} ) \\
&\text{shiftC} = \text{BitDepth}_C - \text{inpTensorBitDepth}_C \\
&\text{if( inpTensorBitDepth}_C \text{ >= BitDepth}_C ) \\
&\quad \text{InpC( x ) = x << ( inpTensorBitDepth}_C - \text{BitDepth}_C ) \\
&\text{else} \\
&\quad \text{InpC( x ) = Clip3(0, ( 1 << inpTensorBitDepth}_C ) - 1, ( x + ( 1 << ( \text{shiftC} - 1 ) ) ) ) >> \text{shiffC} )
\end{aligned}
$$

is present in the output tensor of the NNPF and has a corresponding input picture, and numOutputPics, specifying the total number of pictures present in the output tensor of the NNPF, may be derived as shown in Table 6

TABLE 6

```
for( i = 0, numOutputPics = 0; i < numInputPics; i++ )
    if( nnpfc_input_pic_output_flag[ i ] ) {
        InpIdx[ numOutputPics ] = i
        numOutputPies++
    }
    NumInpPicsInOutputTensor = numOutputPics
    if( pictureRateUpsamplingFlag )
        for( i = 0; i <= numInputPics − 2; i++ )
            numOutputPics += nnpfc_interpolated_pics[ i ]
``` nnpfc_component_last_flag equal to 1 may indicate that the last dimension in the input tensor inputTensor to the NNPF and the output tensor outputTensor resulting from the NNPF is used for a current channel. nnpfc_component_last_flag equal to 0 may indicate that the third dimension in the input tensor inputTensor to the NNPF and the output tensor outputTensor resulting from the NNPF is used for a current channel. The first dimension in the input tensor and in the output tensor may be used for the batch index, which is a practice in some neural network frameworks. While formulae in the semantics of this SEI message use the batch size corresponding to the batch index equal to 0, it is up to the post-processing implementation to determine the batch size used as input to the neural network inference. For example, when nnpfc_inp_order_idc is equal to 3 and nnpfc_auxiliary_inp_idc is equal to 1, there are 7 channels in the input tensor, including four luma matrices, two chroma matrices, and one auxiliary input matrix. In this case, the process DeriveInputTensors( ) would derive each of these 7 channels of the input tensor one by one, and when a particular channel of these channels is processed, that channel may be referred to as the current channel during the process.

nnpfc_inp_format_idc may indicate the method of converting a sample value of the input picture to an input value to the NNPF. When nnpfc_inp_format_idc is equal to 0, the input values to the NNPF are real numbers and the functions InpY( ) and InpC( ) may be specified as shown in Equation 4.

$$ InpY(x) = x \div ((1 \ll BitDepth_Y) - 1) \qquad \text{[Equation 4]} $$

$$ InpC(x) = x \div ((1 \ll BitDepth_C) - 1) $$

The variable inpTensorBitDepth$_Y$ may be derived from the syntax element nnpfc_inp_tensor_luma_bitdepth_minus8 as specified below. The variable inpTensorBitDepth$_C$ may be derived from the syntax element nnpfc_inp_tensor_chroma_bitdepth_minus8 as specified below. Values of nnpfc_inp_format_idc greater than 1 may be reserved for future use and shall not be present in bitstreams. Decoders shall ignore NNPFC SEI messages that contain reserved values of nnpfc_inp_format_idc.

nnpfc_auxiliary_inp_idc greater than 0 may indicate that auxiliary input data is present in the input tensor of the NNPF. nnpfc_auxiliary_inp_idc equal to 0 may indicate that auxiliary input data is not present in the input tensor. nnpfc_auxiliary_inp_idc equal to 1 may specify that auxiliary input data is derived through the method shown in Table 10 to Table 12. The value of nnpfc_auxiliary_inp_idc shall be in the range of 0 to 1, inclusive, in bitstreams. Values of 2 to 255, inclusive, for nnpfc_auxiliary_inp_idc may be reserved for future use and shall not be present in bitstreams. Decoders shall ignore NNPFC SEI messages with nnpfc_auxiliary_inp_idc in the range of 2 to 255, inclusive. Values of nnpfc_auxiliary_inp_idc greater than 255 shall not be present in bitstreams and are not reserved for future use.

nnpfc_inp_order_idc may indicate the method of ordering the sample arrays of an input picture to form an input tensor to the NNPF. The value of nnpfc_inp_order_idc shall be in the range of 0 to 3, inclusive, in bitstreams. Values of 4 to 255, inclusive, for nnpfc_inp_order_idc may be reserved for future use and shall not be present in bitstreams. Decoders shall ignore NNPFC SEI messages with nnpfc_inp_order_idc in the range of 4 to 255, inclusive. Values of nnpfc_inp_order_idc greater than 255 shall not be present in bitstreams and are not reserved for future use. When ChromaFormatIdc is not equal to 1, nnpfc_inp_order_idc shall not be equal to 3. When ChromaFormatIdc is equal to 0, nnpfc_inp_order_idc shall be equal to 0. When chromaUpsamplingFlag is equal to 1, nnpfc_inp_order_idc shall not be equal to 0.

Table 8 shows an informative description of nnpfc_inp_order_idc values.

TABLE 8

Figure 5:
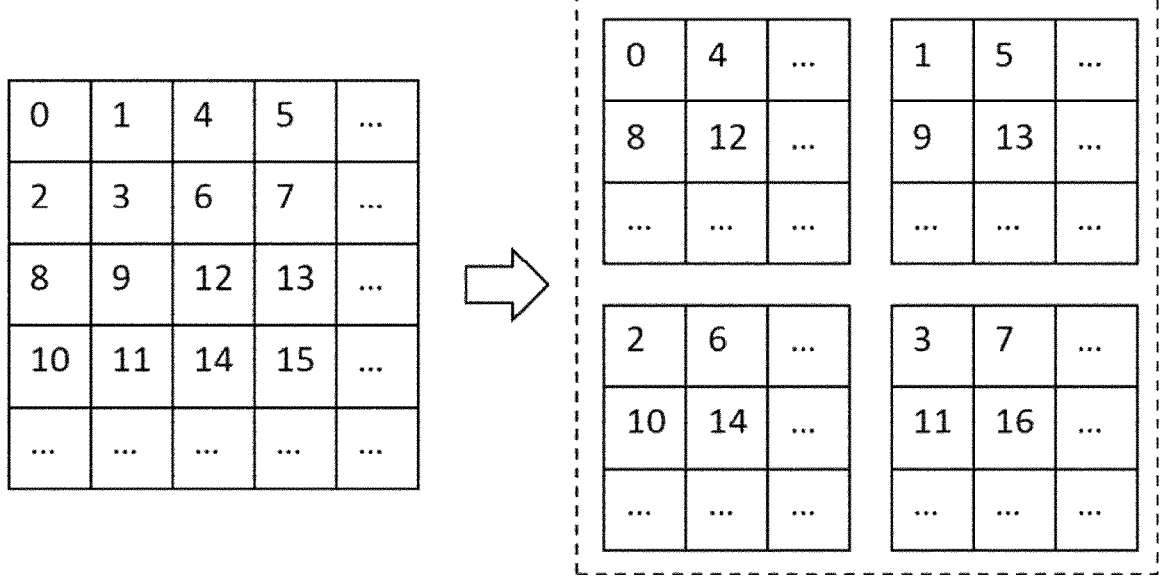
FIG. 5 is view illustrating an interleaved method for derivation of a luma channel.

| nnpfc_inp_order_idc | Description |
|---|---|
| 0 | When nnpfc_inp_order_idc is equal to 0, one luma matrix may be present in the input tensor to each input picture and the number of channels may be 1. When nnpfc_inp_order_idc is equal to 1, one luma matrix and one auxiliary input matrix may be present and the number of channels may be 2. |
| 1 | When nnpfc_inp_order_idc is equal to 0, two chroma matrices may be present in the input tensor and the number of channels may be 2. When nnpfc_inp_order_idc is equal to 1, two chroma matrices and one auxiliary input matrix may be present and the number of channels may be 3. |
| 2 | When nnpfc_inp_order_idc is equal to 0, one luma matrix and two chroma matrices may be present in the input tensor and the number of channels may be 3. When nnpfc_inp_order_idc is equal to 1, one luma matrix, two chroma matrices and one auxiliary input matrix may be present and the number of channels may be 4. |
| 3 | When nnpfc_inp_order_idc is equal to 0, four luma matrices and two chroma matrices may be present in the input tensor and the number of channels may be 6. When nnpfc_inp_order_idc is equal to 1, four luma matrices, two chroma matrices and one auxiliary input matrix may be present and the number of channels may be 7. The luma channel may be derived using an interleaved method as shown in FIG. 5. nnpfc_inp_order_idc may be used only when an input chroma format is 4:2:0. |
| 4 . . . 255 | reserved | nnpfc_inp_tensor_luma_bitdepth_minus8+8 may specify the bit depth of luma sample values in the input integer tensor. The value of inpTensorBitDepth$_Y$ is derived as shown in Equation 5.

$$inpTensorBitDepth_Y = \quad \text{[Equation 5]}$$

$$nnpfc\_inp\_tensor\_luma\_bitdepth\_minus8 + 8$$

It is a requirement of bitstream conformance that the value of nnpfc_inp_tensor_luma_bitdepth_minus8 shall be in the range of 0 to 24, inclusive.

nnpfc_inp_tensor_chroma_bitdepth_minus8+8 may specify the bit depth of chroma sample values in the input integer tensor. The value of inpTensorBitDepth$_C$ may be derived as shown in Equation 6.

$$inpTensorBitDepth_C = \quad \text{[Equation 6]}$$

$$nnpfc\_inp\_tensor\_chroma\_bitdepth\_minus8 + 8$$

It is a requirement of bitstream conformance that the value of nnpfc_inp_tensor_chroma_bitdepth_minus8 shall be in the range of 0 to 24, inclusive.

When nnpfc_auxiliary_inp_idc is equal to 1, the variable strengthControlScaledVal may be derived as shown in Table 9.

TABLE 9

```
for( i = 0; i < numInputPics; i++ )
    if( nnpfc_inp_format_idc = = 1 )
        if( nnpfc_inp_order_idc = = 0 | | nnpfc_inp_order_idc = = 2 | |
            nnpfc inp order idc = = 3 )
            strengthControlScaledVal[ i ] =
                Floor ( StrengthControlVal[ i ] * ( ( 1 << inpTensorBitDepth_Y ) − 1 ) )
        else if( nnpfc inp order idc = = 1 )
            strengthControlScaledVal[ i ] =
                Floor ( StrengthControlVal[ i ] * ( ( 1 << inpTensorBitDepth_C ) − 1 ) )
    else
        strengthControlScaledVal[ i ] = StrengthControlVal[ i ]
```

A patch is a rectangular array of samples from a component (e.g., a luma or chroma component) of a picture.

The process DeriveInputTensors( ) for deriving the input tensor inputTensor for a given vertical sample coordinate cTop and a horizontal sample coordinate cLeft specifying the top-left sample location for the patch of samples included in the input tensor, may be specified as shown in a combination of Table 10 to Table 12.

TABLE 10

```
for( i = 0; i < numInputPics; i++ ) {
    if( nnpfc_inp_order_idc = = 0 )
        for( yP = −nnpfc_overlap; yP < inpPatchHeight + nnpfc_overlap; yP++)
            for( xP = −nnpfc_overlap; xP < inpPatchWidth + nnpfc_overlap; xP++ ) {
                inpVal = InpY( InpSampleVal( cTop + yP, cLeft + xP, CroppedHeight,
                    CroppedWidth, CroppedYPic[ i ], 0 ) )
                yPovlp = yP + nnpfc_overlap
                xPovlp = xP + nnpfc_overlap
                if( !nnpfc_component_last flag )
                    inputTensor[ 0 ][ i ][ 0 ][ yPovlp ][ xPovlp ] = inpVal
                else
                    inputTensor[ 0 ][ i ][ yPovlp ][ xPovlp ][ 0 ] = inpVal
                if( nnpfc_auxiliary_inp_idc = = 1 )
                    if( !nnpfc_component_last_flag )
                        inputTensor[ 0 ][ i ][ 1 ][ yPovlp ][ xPovlp ] = strengthControlScaledVal[ i ]
                    else
                        inputTensor[ 0 ][ i ][ yPovlp ][ xPovlp ][ 1 ] = strengthControlScaledVal[ i ]
            }
    else if( nnpfc_inp_order_idc = = 1 )
        for( yP = −nnpfc_overlap; yP < inpPatchHeight + nnpfc_overlap; yP++)
            for( xP = −nnpfc_overlap; xP < inpPatchWidth + nnpfc_overlap; xP++ ) {
                inpCbVal = InpC( InpSampleVal( cTop + yP, cLeft + xP, CroppedHeight / SubHeightC,
                    CroppedWidth / SubWidthC, CroppedCbPic[ i ], 1 ) )
                inpCrVal = InpC( InpSampleVal( cTop + yP, cLeft + xP, CroppedHeight / SubHeightC,
                    CroppedWidth / SubWidthC, CroppedCrPic[ i ], 2 ) )
                yPovlp = yP + nnpfc_overlap
                xPovlp = xP + nnpfc_overlap
                if( !nnpfc_component_last_flag ) {
                    inputTensor[ 0 ][ i ][ 0 ][ yPovlp ][ xPovlp ] = inpCbVal
                    inputTensor[ 0 ][ i ][ 1 ][ yPovlp ][ xPovlp ] = inpCrVal
                } else }
                    inputTensor[ 0 ][ i ][ yPovlp ][ xPovlp ][ 0 ] = inpCbVal
                    inputTensor[ 0 ][ i ][ yPovlp ][ xPovlp ][ 1 ] = inpCrVal
                }
                if( nnpfc_auxiliary_inp_idc = = 1 )
                    if( !nnpfc_component_last_flag )
                        inputTensor[ 0 ][ i ][ 2 ][ yPovlp ][ xPovlp ] = strengthControlScaledVal[ i ]
                    else
                        inputTensor[ 0 ][ i ][ yPovlp ][ xPovlp ][ 2 ] = strengthControlScaledVal[ i ]
            }
```

TABLE 11

```
else if( nnpfc_inp_order_idc = = 2 )
    for( yP = −nnpfc_overlap; yP < inpPatchHeight + nnpfc_overlap; yP++)
        for( xP = −nnpfc_overlap; xP < inpPatchWidth + nnpfc_overlap; xP++ ) {
            yY = cTop + yP
            xY = cLeft + xP
            yC = yY / SubHeightC
            xC =xY / SubWidthC
            inpYVal = InpY( InpSampleVal( yY, xY, CroppedHeight,
                CroppedWidth, CroppedYPic[ i ], 0 ) )
            inpCbVal = InpC( InpSampleVal( yC, xC, CroppedHeight / SubHeightC,
                CroppedWidth / SubWidthC, CroppedCbPic[ i ], 1 ) )
            inpCrVal = InpC( InpSampleVal( yC, xC, CroppedHeight / SubHeightC,
                CroppedWidth / SubWidthC, CroppedCrPic[ i ], 2 ) )
            yPovlp = yP + nnpfc_overlap
            xPovlp = xP + nnpfc_overlap
            if( !nnpfc_component_last_flag ) {
                inputTensor[ 0 ][ i ][ 0 ][ yPovlp ][ xPovlp ] = inpYVal
                inputTensor[ 0 ][ i ][ 1 ][ yPovlp ][ xPovlp ] = inpCbVal
                inputTensor[ 0 ][ i ][ 2 ][ yPovlp ][ xPovlp ] = inpCrVal
            } else {
                inputTensor[ 0 ][ i ][ yPovlp ][ xPovlp ][ 0 ] = inpYVal
                inputTensor[ 0 ][ i ][ yPovlp ][ xPovlp ][ 1 ] = inpCbVal
                inputTensor[ 0 ][ i ][ yPovlp ][ xPovlp ][ 2 ] = inpCrVal
            }
            if( nnpfc_auxiliary inp_idc = = 1 )
                if( !nnpfc_component_last_flag )
                    inputTensor[ 0 ][ i ][ 3 ][ yPovlp ][ xPovlp ] = strengthControlScaledVal[ i ]
                else
                    inputTensor[ 0 ][ i ][ yPovlp ][ xPovlp ][ 3 ] = strengthControlScaledVal[ i ]
```

TABLE 11-continued

```
        }
    else if( nnpfc_imp_order_idc = = 3 )
        for( yP = −nnpfc_overlap; yP < inpPatchHeight + nnpfc_overlap; yP++)
            for( xP = nnpfc_overlap; xP < inpPatchWidth + nnpfc_overlap; xP++ ) {
                yTL = cTop + yP * 2
                xTL = cLeft + xP * 2
                yBR = yTL + 1
                xBR = xTL + 1
                yC = cTop / 2 + yP
                xC = cLeft / 2 + xP
                inpTLVal = InpY( InpSampleVal( yTL, xTL, CroppedHeight,
                    CroppedWidth, CroppedYPic[ i ], 0 ) )
                inpTRVal = InpY( InpSampleVal( yTL, xBR, CroppedHeight,
                    CroppedWidth, CroppedYPic[ i ], 0 ) )
                inpBLVal = InpY( InpSampleVal( yBR, xTL, CroppedHeight,
                    CroppedWidth, CroppedYPic[ i ], 0 ) )
                inpBRVal = InpY( InpSampleVal( yBR, xBR, CroppedHeight,
                    CroppedWidth, CroppedYPic[ i ], 0 ) )
                inpCbVal = InpC( InpSampleVal( yC, xC, CroppedHeight / 2,
                    CroppedWidth / 2, CroppedCbPic[ i ], 1 ) )
                inpCrVal = InpC( InpSampleVal( yC, xC, CroppedHeight / 2,
                    CroppedWidth / 2, CroppedCrPic[ i ], 2 ) )
                yPovlp = yP + nnpfc_overlap
                xPovlp = xP + nnpfc_overlap
                if( !nnpfc_component_last_flag ) {
```

TABLE 12

```
                    inputTensor[ 0 ][ i ][ 0 ][ yPovlp ][ xPovlp ] = inpTLVal
                    inputTensor[ 0 ][ i ][ 1 ][ yPovlp ][ xPovlp ] = inpTRVal
                    inputTensor[ 0 ][ i ][ 2 ][ yPovlp ][ xPovlp ] = inpBLVal
                    inputTensor[ 0 ][ i ][ 3 ][ yPovlp ][ xPovlp ] = inpBRVal
                    inputTensor[ 0 ][ i ][ 4 ][ yPovlp ][ xPovlp ] = inpCbVal
                    inputTensor[ 0 ][ i ][ 5 ][ yPovlp ][ xPovlp ] = inpCrVal
                } else {
                    inputTensor[ 0 ][ i ][ yPovlp ][ xPovlp ][ 0 ] = inpTLVal
                    inputTensor[ 0 ][ i ][ yPovlp ][ xPovlp ][ 1 ] = inpTRVal
                    inputTensor[ 0 ][ i ][ yPovlp ][ xPovlp ][ 2 ] = inpBLVal
                    inputTensor[ 0 ][ i ][ yPovlp ][ xPovlp ][ 3 ] = inpBRVal
                    inputTensor[ 0 ][ i ][ yPovlp ][ xPovlp ][ 4 ] = inpCbVal
                    inputTensor[ 0 ][ i ][ yPovlp ][ xPovlp ][ 5 ] = inpCrVal
                }
                if( nnpfc auxiliary inp idc = = 1 )
                    if( !nnpfc_component last_flag )
                        inputTensor[ 0 ][ i ][ 6 ][ yPovlp ][ xPovlp ] = strengthControlScaledVal[ i ]
                    else
                        inputTensor[ 0 ][ i ][ yPovlp ][ xPovlp ][ 6 ] = strengthControlScaledVal[ i ]
            }
    }
``` nnpfc_out_format_idc equal to 0 may indicate that the sample values output by the NNPF are real numbers where the value range of 0 to 1, inclusive, maps linearly to the unsigned integer value range of 0 to (1<<bitDepth)−1, inclusive, for any desired bit depth bitDepth for subsequent post-processing or displaying. nnpfc_out_format_idc equal to 1 may indicate that the luma sample values output by the NNPF are unsigned integer numbers in the range of 0 to (1<<outTensorBitDepth$_Y$)−1, inclusive, and the chroma sample values output by the NNPF are unsigned integer numbers in the range of 0 to (1<<outTensorBitDepth$_C$)−1, inclusive. Values of nnpfc_out_format_idc greater than 1 may be reserved for future use and shall not be present in bitstreams. Decoders shall ignore NNPFC SEI messages that contain reserved values of nnpfc_out_format_idc.

nnpfc_out_order_idc may indicate the output order of samples resulting from the NNPF. The value of nnpfc_out_order_idc shall be in the range of 0 to 3, inclusive, in bitstreams. Values of 4 to 255, inclusive, for nnpfc_out_order_idc may be reserved for future use and shall not be present in bitstreams. Decoders shall ignore NNPFC SEI messages with nnpfc_out_order_idc in the range of 4 to 255, inclusive. Values of nnpfc_out_order_idc greater than 255 shall not be present in bitstreams and are not reserved for future use. When chromaUpsamplingFlag is equal to 1, nnpfc_out_order_idc shall not be equal to 0 or 3. When colourizationFlag is equal to 1, nnpfc_out_order_idc shall not be equal to 0.

Table 13 shows an informative description of nnpfc_out_order_idc values.

TABLE 13

| nnpfc_out_order_idc | Description |
|---|---|
| 0 | Since only a luma matrix is present in the output tensor, the number of channels may be equal to 1. |
| 1 | Since only chroma luma matrices are present in the output tensor, the number of channels may be equal to 2. |
| 2 | Since luma and chroma matrices are present in the output tensor, the number of channels may be equal to 3. |
| 3 | Since four luma matrices and two chroma matrices are present in the output tensor, the number of channels may be equal to 6. nnpfc_out_order_idc may be used only when the output chroma format is 4:2:0. |
| 4 . . . 255 | reserved | nnpfc_out_tensor_luma_bitdepth_minus8+8 may specify the bit depth of luma sample values in the output integer tensor. The value of nnpfc_out_tensor_luma_bitdepth_minus8 shall be in the range of 0 to 24, inclusive. The value of outTensorBitDepth$_Y$ may be derived as shown in Equation 7.

$$outTensorBitDepth_Y = \qquad\qquad [Equation\ 7]$$

$$nnpfc\_out\_tensor\_luma\_bitdepth\_minus8 + 8$$

nnpfc_out_tensor_chroma_bitdepth_minus8+8 may specify the bit depth of chroma sample values in the output integer tensor. The value of nnpfc_out_tensor_chroma_bit-depth_minus8 shall be in the range of 0 to 24, inclusive. The value of outTensorBitDepth$_C$ may be derived as shown in Equation 8.

$$outTensorBitDepth_C = \qquad\qquad [Equation\ 8]$$

$$nnpfc\_out\_tensor\_chroma\_bitdepth\_minus8 + 8$$

When bitDepthUpsamplingFlag is equal to 1, the value of nnpfc_out_format_idc shall be equal to 1 and at least one of the following conditions shall be true:

nnpfc_out_tensor_luma_bitdepth_minus8+8 is present and outTensorBitDepth$_Y$ is greater than BitDepth$_Y$.

nnpfc_out_tensor_chroma_bitdepth_minus8+8 is present and outTensorBitDepth$_C$ is greater than BitDepth$_C$.

When nnpfc_inp_tensor_luma_bitdepth_minus8, nnpfc_inp_tensor_chroma_bitdepth_minus8, nnpfc_out_tensor_luma_bitdepth_minus8, and nnpfc_out_tensor_chroma_bitdepth_minus8 are present and outTensorBit-Depth$_Y$ is greater than inpTensorBitDepth$_Y$, outTensorBit-Depth$_C$ shall not be less than inpTensorBitDepth$_C$. When nnpfc_inp_tensor_luma_bitdepth_minus8, nnpfc_inp_tensor_chroma_bitdepth_minus8, nnpfc_out_tensor_luma_bit-depth_minus8, and nnpfc_out_tensor_chroma_bitdepth_minus8 are present and outTensorBitDepth$_C$ is greater than inpTensorBitDepth$_C$, outTensorBitDepth$_Y$ shall not be less than inpTensorBitDepth$_Y$.

The process StoreOutputTensors( ) for deriving sample values in the filtered output sample arrays FilteredYPic, FilteredCbPic, and FilteredCrPic from the output tensor for a given vertical sample coordinate cTop and a horizontal sample coordinate cLeft specifying the top-left sample location for the patch of samples included in the input tensor, may be specified as shown in a combination of Table 14 and Table 15.

TABLE 14

```
for( i = 0; i < numOutputPics; i++ ) {
    if( nnpfc out order idc = = 0 )
        for( yP = 0; yP < outPatchHeight; yP++)
            for( xP = 0; xP < outPatchWidth; xP++ ) {
                yY = cTop * outPatchHeight / inpPatchHeight + yP
                xY = cLeft * outPatchWidth / inpPatchWidth + xP
                if ( yY < nnpfcOutputPicHeight && xY < nnpfcOutputPicWidth )
                    if( !nnpfc_component_last_flag )
                        FilteredYPic[ i ][ xY ][yY ] = outputTensor[ 0 ][ i ][ 0 ][ yP ][ xP ]
                    else
                        FilteredYPic[ i ][ xY ][ yY ] = outputTensor[ 0 ][ i ][ yP ][ xP ][ 0 ]
            }
    else if( nnpfc_out_order_idc = = 1 )
        for( yP = 0; yP < outPatchCHeight; yP++)
            for( xP = 0; xP < outPatchCWidth; xP++ ) {
                xSrc = cLeft * horCScaling + xP
                ySrc = cTop * verCScaling + yP
                if ( ySrc < nnpfcOutputPicHeight / outSubHeightC &&
                    xSrc < nnpfcOutputPicWidth / outSubWidthC )
                    if( !nnpfc_component_last_flag ) {
                        FilteredCbPic[ i ][ xSrc ][ ySrc ] = outputTensor[ 0 ][ i ][ 0 ][ yP ][ xP ]
                        FilteredCrPic[ i ][ xSrc ][ ySrc ] = outputTensor[ 0 ][ i ][ 1 ][ yP ][ xP ]
                    } else {
                        FilteredCbPic[ i ][ xSrc ][ ySrc ] = outputTensor[ 0 ][ i ][ yP ][ xP ][ 0 ]
                        FilteredCrPic[ i ][ xSrc ][ ySrc ] = outputTensor[ 0 ][ i ][ yP ][ xP ][ 1 ]
                    }
            }
    else if( nnpfc_out_order_idc = = 2 )
        for( yP = 0; yP < outPatchHeight: yP++)
```

TABLE 14-continued

```
for( xP = 0; xP < outPatchWidth; xP++ ) {
    yY = cTop * outPatchHeight / inpPatchHeight + yP
    xY = cLeft * outPatchWidth / inpPatchWidth + xP
    yC = yY / outSubHeightC
    xC = xY / outSubWidthC
    yPc = ( yP / outSubHeightC ) * outSubHeightC
    xPc = ( xP / outSubWidthC ) * outSubWidthC
    if ( yY < nnpfcOutputPicHeight && xY << nnpfcOutputPicWidth )
```

TABLE 15

```
        if( !nnpfc component last flag ) {
            FilteredYPic[ i ][ xY ][ yY ] = output Tensor[ 0 ][ i ][ 0 ][ yP ][ xP ]
            FilteredCbPic[ i ][ xC ][ yC ] = outputTensor[ 0 ][ i ][ 1 ][ yPc ][ xPc ]
            FilteredCrPic[ i ][ xC ][ yC ] = output Tensor[ 0 ][ i ][ 2 ][ yPc ][ xPc ]
        } else {
            FilteredYPic[ i ][ xY ][ yY ] = outputTensor[ 0 ][ i ][ yP ][ xP ][ 0 ]
            FilteredCbPic[ i ][ xC ][ yC ] = outputTensor[ 0 ][ i ][ yPc ][ xPc ][ 1 ]
            FilteredCrPic[ i ][ xC ][ yC ] = outputTensor[ 0 ][ i ][ yPc ][ xPc ][ 2 ]
        }
    }
else if( nnpfc out order idc = = 3 )
    for( yP = 0; yP < outPatchHeight; yP++ )
        for( xP = 0; xP < outPatchWidth; xP++ ) {
            ySrc = cTop / 2 * outPatchHeight / inpPatchHeight + yP
            xSrc = cLeft / 2 * outPatchWidth / inpPatchWidth + xP
            if ( ySrc < nnpfcOutputPicHeight /2 &&
                xSrc < nnpfcOutputPicWidth / 2 )
                if( !nnpfc component last flag ) {
                    FilteredYPic[ i ][ xSrc * 2 ][ ySrc * 2 ] = outputTensor[ 0 ][ i ][ 0 ][ yP ][ xP ]
                    FilteredYPic[ i ][ xSrc * 2 + 1 ][ ySrc * 2 ] = outputTensor[ 0 ][ i ][ 1 ][ yP ][ xP ]
                    FilteredYPic[ i ][ xSrc * 2 ][ ySrc * 2 + 1 ] = outputTensor[ 0 ][ i ][ 2 ][ yP ][ xP ]
                    FilteredYPic[ i ][ xSrc * 2 + 1][ ySrc * 2 + 1 ] = outputTensor[ 0 ][ i ][ 3 ][ yP ][ xP ]
                    FilteredCbPic[ i ][ xSrc ][ ySrc ] = outputTensor[ 0 ][ i ][ 4 ][ yP ][ xP ]
                    FilteredCrPic[ i ][ xSrc ][ ySrc ] = outputTensor[ 0 ][ i ][ 5 ][ yP ][ xP ]
                } else {
                    FilteredYPic[ i ][ xSrc * 2 ][ ySrc * 2 ] = outputTensor[ 0 ][ i ][ yP ][ xP ][ 0 ]
                    FilteredYPic[ i ][ xSrc * 2 + 1 ][ ySrc * 2 ] = outputTensor[ 0 ][ i ][ yP ][ xP ][ 1 ]
                    FilteredYPic[ i ][ xSrc * 2 ][ ySrc * 2 + 1 ] = outputTensor[ 0 ][ i ][ yP ][ xP ][ 2 ]
                    FilteredYPic[ i ][ xSrc * 2 + 1][ ySrc * 2 + 1 ] = outputTensor[ 0 ][ i ][ yP ][ xP ][ 3 ]
                    FilteredCbPic[ i ][ xSrc ][ ySrc ] = outputTensor[ 0 ][ i ][ yP ][ xP ][ 4 ]
                    FilteredCrPic[ i ][ xSrc ][ ySrc ] = outputTensor[ 0 ][ i ][ yP ][ xP ][ 5]
                }
        }
    }
}
``` nnpfc_separate_colour_description_present_flag equal to 1 may indicate that a distinct combination of colour primaries, transfer characteristics, matrix coefficients, and scaling and offset values applied in association with the matrix coefficients for the picture resulting from the NNPF is specified in the SEI message syntax structure. nnpfc_separate_colour_description_present_flag equal to 0 indicates that the combination of colour primaries, transfer characteristics, matrix coefficients, and scaling and offset values applied in association with the matrix coefficients for the picture resulting from the NNPF is the same as indicated in VUI parameters for the CLVS.

nnpfc_colour_primaries may have the same semantics as defined for the vui_colour_primaries syntax element, except as follows:

nnpfc_colour_primaries may specify the colour primaries of the picture resulting from applying the NNPF specified in the SEI message, rather than the colour primaries used for the CLVS.

When nnpfc_colour_primaries is not present in the NNPFC SEI message, the value of nnpfc_colour_primaries may be inferred to be equal to vui_colour_primaries.

nnpfc_transfer_characteristics may have the same semantics as defined for the vui_transfer_characteristics syntax element, except as follows:

nnpfc_transfer_characteristics may specify the transfer characteristics of the picture resulting from applying the NNPF specified in the SEI message, rather than the transfer characteristics used for the CLVS.

When nnpfc_transfer_characteristics is not present in the NNPFC SEI message, the value of nnpfc_transfer_characteristics may be inferred to be equal to vui_transfer_characteristics.

nnpfc_matrix_coeffs may describe equations used to derive luma and chroma signals from green, blue and red or Y, Z and X primaries. The semantics of nnpfc_matrix_coeffs may be applied to pictures resulting from applying NNPF specified in the SEI message, and BitDepth Y and BitDepthC may be equal to outTensorBitDepthY and outTensorBitDepthC, respectively, as indicated for MatrixCoefficients. When nnpfc_matrix_coeffs is not present in the NNPFC SEI message, the value of nnpfc_matrix_coeffs may be inferred to be equal to vui_matrix_coeffs.

nnpfc_matrix_coeffs shall not be equal to 0 unless both of the following conditions are true:

nnpfc_out_tensor_chroma_bitdepth_minus8 is equal to nnpfc_out_tensor_luma_bitdepth_minus8.

nnpfc_out_order_idc is equal to 2, outSubHeightC is equal to 1, and outSubWidthC is equal to 1.

nnpfc_matrix_coeffs shall not be equal to 8 unless one of the following conditions is true:

> nnpfc_out_tensor_chroma_bitdepth_minus8 is equal to nnpfc_out_tensor_luma_bitdepth_minus8.
>
> nnpfc_out_tensor_chroma_bitdepth_minus8 is equal to nnpfc_out_tensor_luma_bitdepth_minus8+1, nnpfc_out_order_idc is equal to 2, outSubHeightC is equal to 1, and outSubWidthC is equal to 1.

nnpfc_full_range_flag may indicate the scaling and offset values applied in association with the matrix coefficients as specified by nnpfc_matrix_coeffs. The semantics of nnpfc_full_range_flag are as specified for VideoFullRangeFlag. When nnpfc_full_range_flag is not present, the value of nnpfc_full_range_flag may be inferred to be equal to 0.

nnpfc_chroma_loc_info_present_flag equal to 1 may indicate the presence of the nnpfc_chroma_sample_loc_type_frame syntax element in the NNPFC SEI message. nnpfc_chroma_loc_info_present_flag equal to 0 may indicate the absence of the nnpfc_chroma_sample_loc_type_frame syntax element in the NNPFC SEI message. When colourizationFlag is equal to 0 or nnpfc_out_colour_format_idc is not equal to 1, the value of nnpfc_chroma_loc_info_present_flag shall be equal to 0.

When nnpfc_chroma_sample_loc_type_frame is not equal to 6 and nnpfc_out_colour_format_idc is equal to 1, nnpfc_chroma_sample_loc_type_frame may specify the location of chroma samples of the output pictures. nnpfc_chroma_sample_loc_type_frame equal to 6 and nnpfc_out_colour_format_idc equal to 1 may indicate that the location of the chroma samples is unknown or unspecified or specified by other methods. The value of nnpfc_chroma_sample_loc_type_frame shall be in the range of 0 to 6, inclusive.

nnpfc_overlap may indicate the overlapping horizontal and vertical sample counts of adjacent input tensors of the NNPF. The value of nnpfc_overlap shall be in the range of 0 to 16 383, inclusive.

nnpfc_constant_patch_size_flag equal to 1 may indicate that the NNPF accepts exactly the patch size indicated by nnpfc_patch_width_minus1 and nnpfc_patch_height_minus1 as input. nnpfc_constant_patch_size_flag equal to 0 may indicate that the NNPF accepts as input any patch size counts of the patch size required for the input to the NNPF. The value of nnpfc_patch_height_minus1 shall be in the range of 0 to Min (32 766, CroppedHeight−1), inclusive.

nnpfc_extended_patch_width_cd_delta_minus1+1+2*nnpfc_overlap, when nnpfc_constant_patch_size_flag equal to 0, may indicate a common divisor of all allowed values of the width of an extended patch required for the input to the NNPF. The value of nnpfc_extended_patch_width_cd_delta_minus1 shall be in the range of 0 to Min (32 766, CroppedWidth−1), inclusive.

nnpfc_extended_patch_height_cd_delta_minus1+1+2*nnpfc_overlap, when nnpfc_constant_patch_size_flag equal to 0, may indicate a common divisor of all allowed values of the height of an extended patch required for the input to the NNPF. The value of nnpfc_extended_patch_height_cd_delta_minus1 shall be in the range of 0 to Min (32 766, CroppedHeight−1), inclusive.

The variables inpPatchWidth and inpPatchHeight may be set to the patch size width and the patch size height, respectively.

If nnpfc_constant_patch_size_flag is equal to 0, the following applies:

> The values of inpPatchWidth and inpPatchHeight may be either provided by external means or set by the post-processor itself.
>
> The value of inpPatchWidth+2*nnpfc_overlap shall be a positive integer multiple ofnnpfc_extended_patch_width_cd_delta_minus1+1+2*nnpfc_overlap and inpPatchWidth shall be less than or equal to CroppedWidth. The value of inpPatchHeight+2*nnpfc_overlap shall be a positive integer multiple ofnnpfc_extended_patch_height_cd_delta_minus1+1+2*nnpfc_overlap and inpPatchHeight shall be less than or equal to CroppedHeight.

Otherwise (nnpfc_constant_patch_size_flag is equal to 1), the value of inpPatch Width may be set equal to nnpfc_patch_width_minus1+1 and the value of inpPatchHeight may be set equal to nnpfc_patch_height_minus1+1.

The variables outPatchWidth, outPatchHeight, horCScaling, verCScaling, outPatchCWidth, and outPatchCHeight may be derived as shown in Table 16.

TABLE 16 outPatchWidth = ( nnpfcOutputPicWidth * inpPatchWidth ) / CroppedWidth
outPatchHeight = ( nnpfcOutputPicHeight * inpPatchHeight ) / CroppedHeight
horCScaling = SubWidthC / outSubWidthC
verCScaling = SubHeightC / outSubHeightC
outPatchCWidth = outPatchWidth * horCScaling
outPatchCHeight = outPatchHeight * verCScaling with width inpPatchWidth and height inpPatchHeight such that the width of an extended patch (i.e., a patch plus the overlapping area), which is equal to inpPatchWidth+2*nnpfc_overlap, is a positive integer multiple of nnpfc_extended_patch_width_cd_delta_minus1+1+2*nnpfc_overlap, and the height of the extended patch, which is equal to inpPatchHeight+2*nnpfc_overlap, is a positive integer multiple of nnpfc_extended_patch_height_cd_delta_minus1+1+2*nnpfc_overlap.

nnpfc_patch_width_minus1+1, when nnpfc_constant_patch_size_flag equal to 1, may indicate the horizontal sample counts of the patch size required for the input to the NNPF. The value of nnpfc_patch_width_minus1 shall be in the range of 0 to Min (32 766, CroppedWidth−1), inclusive.

nnpfc_patch_height_minus1+1, when nnpfc_constant_patch_size_flag equal to 1, may indicate the vertical sample It is a requirement of bitstream conformance that outPatchWidth*CroppedWidth shall be equal to nnpfcOutputPicWidth*inpPatchWidth and outPatchHeight*CroppedHeight shall be equal to nnpfcOutputPicHeight*inpPatchHeight.

nnpfc_padding_type may indicate the process of padding when referencing sample locations outside the boundaries of the input picture as described in Table 17. The value of nnpfc_padding_type shall be in the range of 0 to 4, inclusive. Values of 5 to 15, inclusive, for nnpfc_padding_type may be reserved for future use and shall not be present in bitstreams. Decoders shall ignore NNPFC SEI messages with nnpfc_padding_type in the range of 5 to 15, inclusive. Values of nnpfc_padding_type greater than 15 shall not be present in bitstreams and are not reserved for future use.

TABLE 17

| nnpfc_padding_type | Description |
|---|---|
| 0 | zero padding |
| 1 | replication padding |
| 2 | reflection padding |
| 3 | wrap-around padding |
| 4 | fixed padding |
| 5 . . . 15 | reserved | nnpfc_luma_padding_val may indicate the luma value to be used for padding when nnpfc_padding_type is equal to 4. The value of nnpfc_luma_padding_val shall be in the range of 0 to $(1<<BitDepth_Y)-1$, inclusive.

nnpfc_cb_padding_val may indicate the Cb value to be used for padding when nnpfc_padding_type is equal to 4. The value of nnpfc_cb_padding_val shall be in the range of 0 to $(1<<BitDepth_C)-1$, inclusive.

nnpfc_cr_padding_val may indicate the Cr value to be used for padding when nnpfc_padding_type is equal to 4. The value of nnpfc_cr_padding_val shall be in the range of 0 to $(1<<BitDepth_C)-1$, inclusive.

The function InpSampleVal (y, x, picHeight, picWidth, croppedPic, cIdx) with inputs being a vertical sample location y, a horizontal sample location x, a picture height picHeight, a picture width picWidth, sample array croppedPic, and component index cIdx (equal to 0 for luma, 1 for Cb, and 2 for Cr) may return the value of sampleVal derived as shown in Table 18.

TABLE 18

```
if( nnpfc_padding_type = = 0 )
    if( y < 0 | | x < 0 | | y >= picHeight | | x >= picWidth )
        sampleVal = 0
    else
        sampleVal = croppedPic[ x ][ y ]
else if( nnpfc padding type = = 1 )
    sampleVal = croppedPic[ Clip3( 0, picWidth − 1, x ) ][ Clip3( 0, picHeight − 1, y ) ]
else if( nnpfc padding type = = 2 )
    sampleVal = croppedPic[ Reflect( picWidth − 1, x ) ][ Reflect( picHeight − 1, y ) ]
else if( nnpfc_padding_type = = 3 )
    if( y >= 0 && y < picHeight )
        sampleVal = croppedPic[ Wrap( picWidth − 1, x ) ][ y ]
else if( nnpfc padding type = = 4 )
    if( y < Q | | x < 0 | | y >= picHeight | | x >= picWidth )
        sampleVal = ( cIdx = = 0 ? nnpfc_luma_padding_val :
            ( cIdx = = 1 ? nnpfc cb padding val : nnpfc cr padding val ) )
    else
        sampleVal = croppedPic[ x ][ y ]
```

An NNPF PostProcessingFilter( ) is the target NNPF as derived in the semantics of the NNPFA SEI message.

The process of Table 19 may be used, with the NNPF PostProcessingFilter( ) to generate, in a patch-wise manner, the filtered and/or interpolated picture(s), which may contain Y, Cb, and Cr sample arrays FilteredYPic, FilteredCbPic, and FilteredCrPic, respectively, as indicated by nnpfc_out_order_idc:

TABLE 19

```
if( nnpfc_inp_order_idc = = 0 | | nnpfc_inp_order_idc = = 2 )
    for( cTop = 0; cTop < CroppedHeight; cTop += inpPatchHeight )
        for( cLeft = 0; cLeft < CroppedWidth; cLeft += inpPatchWidth ) {
            DeriveInputTensors( )
            outputTensor = PostProcessingFilter( inputTensor )
            StoreOutputTensors( )
        }
else if( nnpfc_inp_order_idc = = 1 )
    for( cTop = 0; cTop < CroppedHeight / SubHeightC; cTop += inpPatchHeight )
        for( cLeft = 0; cLeft < CroppedWidth / SubWidthC; cLeft += inpPatchWidth ) {
            DeriveInputTensors( )
            outputTensor = PostProcessingFilter( input Tensor )
            StoreOutputTensors( )
        }
else if( nnpfc_inp_order idc = = 3 )
    for( cTop = 0; cTop < CroppedHeight; cTop += inpPatchHeight * 2 )
        for( cLeft = 0; cLeft < CroppedWidth; cLeft += inpPatchWidth * 2 ) {
            DeriveInputTensors( )
            outputTensor = PostProcessingFilter( inputTensor )
            StoreOutputTensors( )
        }
```

An NNPF-generated picture with index i may contain sample arrays FilteredYPic[i], FilteredCbPic[i], and FilteredCrPic[i], when present. An NNPF-generated picture may not include the overlap regions.

The NNPF process consists of the process defined in Table 19 followed by outputting NNPF-generated pictures in their increasing index order, where all NNPF-generated pictures that were interpolated by the NNPF are output and those NNPF-generated pictures that correspond to any input pictures to the NNPF may be output as specified in the semantics of the NNPFA SEI message.

nnpfc_complexity_info_present_flag equal to 1 may specify that one or more syntax elements that indicate the complexity of the NNPF associated with the nnpfc_id are present. nnpfc_complexity_info_present_flag equal to 0 may specify that no syntax elements that indicates the complexity of the NNPF associated with the nnpfc_id are present.

nnpfc_parameter_type_idc equal to 0 may indicate that the neural network uses only integer parameters. nnpfc_parameter_type_flag equal to 1 may indicate that the neural network may use floating point or integer parameters. nnpfc_parameter_type_idc equal to 2 may indicate that the neural network uses only binary parameters. nnpfc_parameter_type_idc equal to 3 may be reserved for future use and shall not be present in bitstreams. Decoders shall ignore NNPFC SEI messages with nnpfc_parameter_type_idc equal to 3.

nnpfc_log 2_parameter_bit_length_minus3 equal to 0, 1, 2, and 3 may indicate that the neural network does not use parameters of bit length greater than 8, 16, 32, and 64, respectively. When nnpfc_parameter_type_idc is present and nnpfc_log 2_parameter_bit_length_minus3 is not present, the neural network may not use parameters of bit length greater than 1.

nnpfc_num_parameters_idc may indicate the maximum number of neural network parameters for the NNPF in units of a power of 2 048. nnpfc_num_parameters_idc equal to 0 may indicate that the maximum number of neural network parameters is unknown. The value nnpfc_num_parameters_idc shall be in the range of 0 to 52, inclusive. Values of nnpfc_num_parameters_idc greater than 52 are reserved for future use and shall not be present in bitstreams. Decoders shall ignore NNPFC SEI messages with nnpfc_num_parameters_idc greater than 52.

If the value of nnpfc_num_parameters_idc is greater than zero, the variable maxNumParameters is derived as shown in Equation 9.

$$maxNumParameters =$$ [Equation 9]

$$(2048 \ll nnpfc\_num\_parameters\_idc) - 1$$

It is a requirement of bitstream conformance that the number of neural network parameters of the NNPF shall be less than or equal to maxNumParameters.

nnpfc_num_kmac_operations_idc greater than 0 may indicate that the maximum number of multiply-accumulate operations per sample of the NNPF is less than or equal to nnpfc_num_kmac_operations_idc*1 000. nnpfc_num_kmac_operations_idc equal to 0 may indicate that the maximum number of multiply-accumulate operations of the network is unknown. The value of nnpfc_num_kmac_operations_idc shall be in the range of 0 to $2^{32}$-2, inclusive.

nnpfc_total_kilobyte_size greater than 0 may indicate a total size in kilobytes required to store the uncompressed parameters for the neural network. The total size in bits is a number equal to or greater than the sum of bits used to store each parameter.

nnpfc_total_kilobyte_size is the total size in bits divided by 8 000, rounded up. nnpfc_total_kilobyte_size equal to 0 may indicate that the total size required to store the parameters for the neural network is unknown. The value of nnpfc_total_kilobyte_size shall be in the range of 0 to $2^{32}$-2, inclusive.

nnpfc_metadata_extension_num_bits equal to 0 may specify that nnpfc_reserved_metadata_extension is not present. nnpfc_metadata_extension_num_bits greater than 0 may specify the length, in bits, of nnpfc_reserved_metadata_extension. nnpfc_metadata_extension_num_bits shall be equal to 0. Values in the range of 1 to 2 048, inclusive, for nnpfc_metadata_extension_num_bits are reserved for future use and shall not be present in bitstreams. Decoders shall allow any value of nnpfc_metadata_extension_num_bits in the range of 0 to 2048, inclusive. Values of nnpfc_metadata_extension_num_bits greater than 2048 shall not be present in bitstreams and may not be reserved for future use.

nnpfc_reserved_metadata_extension shall not be present in bitstreams. However, decoders shall ignore the presence and value of nnpfc_reserved_metadata_extension. When present, the length, in bits, of nnpfc_reserved_metadata_extension may be equal to nnpfc_metadata_extension_num_bits.

nnpfc_reserved_zero_bit_b shall be equal to 0 in bitstreams. Decoders shall ignore NNPFC SEI messages in which nnpfc_reserved_zero_bit_b is not equal to 0.

nnpfc_payload_byte[i] may contain the i-th byte of a bitstream. The byte sequence nnpfc_payload_byte[i] for all present values of i shall be a complete bitstream that conforms to ISO/IEC 15938-17.

Neural-Network Post-Filter Activation (NNPFA)

The syntax structure for the NNPFA is shown in Table 20.

TABLE 20

|  | Descriptor |
| --- | --- |
| nn_post_filter_activation( payloadSize ) { |  |
|     nnpfa_target_id | ue(v) |
|     nnpfa_cancel_flag | u(1) |
|     if( !nnpfa_cancel_flag ) { |  |
|         nnpfa_target_base_flag | u(1) |
|         nnpfa_persistence_flag | u(1) |
|         nnpfa_num_output_entries | ue(v) |
|         for( i = 0; i < nnpfa_num_output_entries; i++ ) |  |
|             nnpfa_output_flag[ i ] | u(1) |
|     } |  |
| } |  |

The NNPFA syntax structure of Table 20 may be signaled in the form of an SEI message. An SEI message signaling the NNPFA syntax structure of Table 20 may be referred to as an NNPFA SEI message.

The neural-network post-filter activation (NNPFA) SEI message may activate or de-activate the possible use of the target neural-network post-processing filter (NNPF), identified by nnpfa_target_id, for post-processing filtering of a set of pictures. For a particular picture for which the NNPF is activated, the target NNPF may be derived as follows:

If nnpfa_target_base_flag is equal to 1, the target NNPF is the base NNPF with nnpfc_id equal to nnpfa_target_id.

Otherwise (nnpfa_target_base_flag is equal to 0), the target NNPF is the NNPF specified by the last NNPFC SEI message with nnpfc_id equal to nnpfa_target_id that precedes the first VCL NAL unit of the current picture in decoding order and is not a repetition of the NNPFC SEI message that contains the base NNPF.

There may be several NNPFA SEI messages present for the same picture, for example, when the NNPFs are meant for different purposes or for filtering of different colour components.

nnpfa_target_id may indicate the target NNPF, which is specified by one or more NNPFC SEI messages that pertain to the current picture and have nnpfc_id equal to nnpfa_target_id. The value of nnpfa_target_id shall be in the range of 0 to $2^{32}-2$, inclusive.

An NNPFA SEI message with a particular value of nnpfa_target_id shall not be present in a current PU unless one or both of the following conditions are true:

Within the current CLVS, there is an NNPFC SEI message with nnpfc_id equal to the particular value of nnpfa_target_id present in a PU preceding the current PU in decoding order.

There is an NNPFC SEI message with nnpfc_id equal to the particular value of nnpfa_target_id in the current PU.

When a PU contains both an NNPFC SEI message with a particular value of nnpfc_id and an NNPFA SEI message with nnpfa_target_id equal to the particular value of nnpfc_id, the NNPFC SEI message shall precede the NNPFA SEI message in decoding order.

nnpfa_cancel_flag equal to 1 may indicate that the persistence of the target NNPF established by any previous NNPFA SEI message with the same nnpfa_target_id as the current SEI message is cancelled, i.e., the target NNPF is no longer used unless it is activated by another NNPFA SEI message with the same nnpfa_target_id as the current SEI message and nnpfa_cancel_flag equal to 0. nnpfa_cancel_flag equal to 0 may indicate that the nnpfa_target_base_flag, nnpfa_persistence_flag, and nnpfa_num_output_entries follow.

nnpfa_target_base_flag equal to 1 may specify that the target NNPF is the base NNPF with nnpfc_id equal to nnpfa_target_id. nnpfa_target_base_flag equal to 0 may specify that the target NNPF is the NNPF specified by the last NNPFC SEI message with nnpfc_id equal to nnpfa_target_id that precedes the first VCL NAL unit of the current picture in decoding order and is not a repetition of the NNPFC SEI message that contains the base NNPF.

nnpfa_persistence_flag may specify the persistence of the target NNPF for the current layer. nnpfa_persistence_flag equal to 0 may specify that the target NNPF may be used for post-processing filtering for the current picture only. nnpfa_persistence_flag equal to 1 may specify that the target NNPF may be used for post-processing filtering for the current picture and all subsequent pictures of the current layer in output order until one or more of the following conditions are true:

A new CLVS of the current layer begins.

The bitstream ends.

A picture in the current layer associated with a NNPFA SEI message with the same nnpfa_target_id as the current SEI message and nnpfa_cancel_flag equal to 1 is output that follows the current picture in output order.

The target NNPF is not applied for this subsequent picture in the current layer associated with a NNPFA SEI message with the same nnpfa_target_id as the current SEI message and nnpfa_cancel_flag equal to 1.

The nnpfcTargetPictures may be the set of pictures to which the last NNPFC SEI message with nnpfc_id equal to nnpfa_target_id that precedes the current NNPFA SEI message in decoding order pertains. nnpfaTargetPictures may be the set of pictures for which the target NNPF is activated by the current NNPFA SEI message. It is a requirement of bitstream conformance that any picture included in nnpfaTargetPictures shall also be included in nnpfc TargetPictures.

nnpfa_num_output_entries may specify the number of nnpfa_output_flag[i] syntax elements present in the NNPFA SEI message. The value of nnpfa_num_output_entries shall be in the range of 0 to NumInpPicsInOutputTensor, inclusive. When PictureRateUpsamplingFlag is equal to 0 and nnpfa_num_output_entries is equal to NumInpPicsInOutputTensor, nnpfa_output_flag[i] shall be equal to 1 for at least one value of i in the range of 0 to nnpfa_num_output_entries−1, inclusive.

nnpfa_output_flag[i] equal to 1 may specify that the NNPF-generated picture that corresponds to the input picture having index InpIdx[i] is output by the NNPF process activated by this NNPFA SEI message, where the NNPF process may be specified in the semantics of the NNPFC SEI message.

nnpfa_output_flag[i] equal to 0 may specify that the NNPF-generated picture that corresponds to the input picture having index InpIdx[i] is not output by the NNPF process activated by this NNPFA SEI message. When nnpfa_num_output_entries is less than NumInpPicsInOutputTensor, nnpfa_output_flag[i] may be inferred to be equal to 1 for each value of i in the range of nnpfa_num_output_entries to NumInpPicsInOutputTensor−1, inclusive.

Neural-Network Post-Filter Group Characteristics SEI Message Syntax

The neural-network post-filter group characteristics (NNPFGC) SEI message specifies a neural network post-filter (NNPF) group. It is indicated by the SEI message if the NNPF group defines an NNPF cascade or defines NNPFs or NNPF groups of NNPF cascades that are alternatives to each other. The use of NNPF groups of NNPF cascades for specific pictures is indicated with neural-network post-filter group activation (NNPFGA) SEI messages.

Table 21 represent an example of NNPFC syntax structure.

TABLE 21

| | Descriptor |
| --- | --- |
| nn_post_filter_group_characteristics( payloadSize ) { | |
|    nnpfgc_id | ue(v) |
|    nnpfgc_grouping_type | ue(v) |
|    if( nnpfgc_grouping_type = = 0 \| \| nnpfgc_grouping_type = = 2 ) | |
|       nnpfgc_purpose | u(16) |
|    nnpfgc_num_members_minus2 | ue(v) |
|    for( i = 0; i <= nnpfgc_num_members_minus2 + 1; i++ ) | |
|       nnpfgc_member_id[ i ] | |

TABLE 21-continued

| | Descriptor |
| --- | --- |
| nnpfgc_complexity_info_present_flag | u(1) |
| if( nnpfgc_complexity_info_present_flag ) { | |
|   nnpfgc_parameter_type_idc | u(2) |
|   if( nnpfgc_parameter_type_idc != 2 ) | |
|     nnpfgc_log2_parameter_bit_length_minus3 | u(2) |
|   nnpfgc_num_parameters_idc | u(6) |
|   nnpfgc_num_kmac_operations_idc | ue(v) |
|   nnpfgc_total_kilobyte_size | ue(v) |
|   } | |
| } | | nnpfgc_id contains an identifying number that may be used to identify an NNPF group. The value of nnpfgc_id shall be in the range of 0 to $2^{32}-2$, inclusive. Values of nnpfgc_id from 256 to 511, inclusive, and from $2^{31}$ to $2^{32}-2$, inclusive, may be reserved for future use. Decoders encountering an NNPFGC SEI message with nnpfgc_id in the range of 256 to 511, inclusive, or in the range of $2^{31}$ to $2^{32}-2$, inclusive, may ignore the SEI message in such configurations. The value of nnpfgc_id shall not be equal to any nnpfc_id value of any NNPFC SEI message present in the same CLVS. When the value of nnpfgc_id of an NNPFGC SEI message nnpfgcSeiA is equal to the value of nnpfgc_id of another NNPFGC SEI message nnpfgcSeiB present in the same CLVS, nnpfgcSeiA and nnpfgcSeiB shall be identical.

nnpfgc_grouping_type equal to 0 indicates that this SEI message specifies a group of cascaded neural-network post-filters.

nnpfgc_grouping_type equal to 1 indicates that the NNPFs or NNPF groups identified by the nnpfgc_member_id[i] are alternatives to each other out of which the post-processor should select only one to be applied.

nnpfgc_grouping_type equal to 2 indicates that this SEI message specifies a group of NNPFs that are intended to be used jointly and are activated in an alternating manner so that at most one of these NNPFs is activate for any picture.

nnpfgc_grouping_type equal to 3 indicates that the NNPFs or NNPF groups identified by the nnpfgc_member_id[i] are intended to be used in parallel.

nnpfgc_grouping_type equal to 4 indicates that the NNPFs or NNPF groups identified by the nnpfgc_member_id[i] are optional, i.e., may or may not be applied by the post-processor.

The value of nnpfgc_grouping_type shall be in the range of 0 to $2^{55}$, inclusive. Values of nnpfgc_grouping_type in the range of 5 to $2^{55}$, inclusive, may be reserved for future specification and may not be present in bitstreams. Decoders may ignore NNPFGC SEI messages with nnpfgc_grouping_type in the range of 5 to $2^{55}$, inclusive, for such configurations.

nnpfgc_purpose has the semantics of nnpfc_purpose but with the exception that the semantics are specified for the NNPF group defined by this SEI message rather than the NNPF defined by an NNPFC SEI message.

nnpfgc_num_members_minus2 plus 2 indicates the number of NNPFs or NNPF groups in the NNPF group that this SEI message defines.

nnpfgc_member_id[i] indicates the i-th member in the NNPF group defined by this SEI message as follows:

If there is an NNPF with nnpfc_id equal to nnpfgc_member_id[i] defined in the CLVS, the i-th member in the NNPF group defined by this SEI message is an NNPF that has nnpfc_id equal to nnpfgc_member_id[i].

Otherwise (there is no NNPF with nnpfc_id equal to nnpfgc_member_id[i] defined in the CLVS), the i-th member in the NNPF group defined by this SEI message is an NNPF group with nnpfgc_id equal to nnpfgc_member_id[i].

When an nnpfgc_member_id[i] value references an nnpfgc_id value of an NNPFGC SEI message nnpfgcSei, it is a requirement of bitstream conformance that the NNPFGC SEI message nnpfgcSei shall have nnpfgc_grouping_type equal to 0. When nnpfgc_grouping_type is equal to 0 or 2, it is a requirement of bitstream conformance that there is an NNPF with nnpfc_id value equal to nnpfgc_member_id[i] defined in the CLVS. When nnpfgc_grouping_type is equal to 1, 3, or 4, it is a requirement of bitstream conformance that there is an NNPF with nnpfc_id value equal to nnpfgc_member_id[i] or an NNPF group with nnpfgc_id value equal to nnpfgc_member_id[i] defined in the CLVS.

When nnpfgc_grouping_type is equal to 0, the NNPFs with nnpfc_id equal to nnpfgc_member_id[i] are performed in cascade in increasing order of i, as activated by an NNPFGA SEI message with nnpfga_target_id equal to nnpfgc_id.

nnpfgc_complexity_info_present_flag, nnpfgc_parameter_type_idc, nnpfgc_log 2_parameter_bit_length_minus3, nnpfgc_num_parameters_idc, nnpfgc_num_kmac_operations_idc, and nnpfgc_total_kilobyte_size have the semantics of nnpfc_complexity_info_present_flag, nnpfc_parameter_type_idc, nnpfc_log 2_parameter_bit_length_minus3, nnpfc_num_parameters_idc, nnpfc_num_kmac_operations_idc, and nnpfc_total_kilobyte_size, respectively, but with the exception that the semantics are specified for the NNPF group defined by this SEI message rather than the NNPF defined by an NNPFC SEI message. When nnpfgc_grouping_type is equal to 1, nnpfgc_complexity_info_present_flag shall be equal to 0.

Neural-Network Post-Filter Group Activation SEI Message

The neural-network post-filter group activation (NNPFGA) SEI message activates or de-activates the possible use of the target neural-network post-processing filter group (NNPFG) of NNPF groups, identified by nnpfga_target_id, for post-processing filtering of a set of pictures.

nnpfgc_grouping_type for the identified NNPF group shall be equal to 0 (cascade) or 1 (alternatives). When nnpfgc_grouping_type is equal to 1, each member of the group shall have the same number of input pictures and NNPF output pictures.

For a particular picture for which the NNPFG is activated, the target NNPFG is the NNPFG specified by the last NNPFGC SEI message with nnpfgc_id equal to nnpfga_target_id, that precedes the first VCL NAL unit of the current picture in decoding order and the NNPFs of the target NNPFG are defined by the NNPFC SEI messages that have nnpfc_id equal to any nnpfgc_member_id[i] value of the target NNPFG and are present in the current picture unit or precede the current picture in decoding order.

Table 22 represents an example of NNPFC syntax structure.

TABLE 22

| | Descriptor |
|---|---|
| nn_post_filter_group_activation( payloadSize ) { | |
|   nnpfga_target_id | ue(v) |
|   nnpfga_cancel_flag | u(1) |
|   if( !nnpfga_cancel_flag ) { | |
|     nnpfga_persistence_flag | u(1) |
|     nnpfga_num_filters_minus2 | ue(v) |
|     for( i = 0; i <= nnpfga_num_filters_minus2 + 1; +++ ) { | |
|       nnpfga_target_base_flag[ i ] | u(1) |
|       nnpfga_input_all_pics_flag[ i ] | u(1) |
|       if( !nnpfga_input_all_pics_flag[ i ] ) { | |
|         nnpfga_num_input_pics_minus1[ i ] | ue(v) |
|         for( j = 0; i <= nnpfga_num_input_pics_minus1[ i ]; j++ ) | |
|           nnpfga_input_pic_skip_count[ i ][ j ] | ue(v) |
|       } | |
|       nnpfga_num_output_entries[ i ] | ue(v) |
|       for( j = 0; j < nnpfga_num_output_entries[ i ]; j++ ) | |
|         nnpfga_output_flag[ i ][ j ] | u(1) |
|     } | |
|   } | |
| } | |

Use of this SEI message requires the definition of the following variables:

Input picture width and height in units of luma samples, denoted herein by InitCroppedWidth[idx] and InitCroppedHeight[idx], respectively, of the candidate input pictures with index idx in the range of 0 to numCandInputPics−1, inclusive, that may be used as input for the NNPFG.

Luma sample array InitCroppedYPic[idx] and chroma sample arrays InitCroppedCbPic[idx] and InitCroppedCrPic[idx], when present, of the candidate input pictures with index idx in the range of 0 to numCandInputPics−1, inclusive, that may be used as input for the NNPFG.

Bit depth BitDepthY for the luma sample array of the candidate input pictures.

Bit depth BitDepthC for the chroma sample arrays, if any, of the candidate input pictures.

A chroma format indicator, denoted herein by ChromaFormatIdc, as described in subclause 7.3.

When nnpfc_auxiliary_inp_idc is equal to 1, a filtering strength control value array StrengthControlVal[idx] that shall contain real numbers in the range of 0 to 1, inclusive, of the candidate input pictures with index idx in the range of 0 to numCandInputPics−1, inclusive.

Candidate input picture with index 0 corresponds to the picture for which the NNPFG is activated by this NNPFGA SEI message. Candidate input picture with index i in the range of 1 to numCandInputPics−1, inclusive, precedes the candidate input picture with index i−1 in output order. Let candInputPicList[0] be the list of candidate input pictures in inverse output order.

nnpfga_target_id indicates the target NNPFG, which is specified by the NNPFGC SEI message that pertains to the current picture and have nnpfgc_id equal to nnpfga_target_id.

The value of nnpfga_target_id shall be in the range of 0 to $2^{32}$−2, inclusive.

An NNPFGA SEI message with a particular value of nnpfga_target_id shall not be present in a current PU unless there is an NNPFGC SEI message with nnpfgc_id equal to the particular value of nnpfga_target_id and nnpfgc_grouping_type equal to 0 present in the current PU or in a PU that precedes the current PU in decoding order within the current CLVS.

When a PU contains both an NNPFGC SEI message with a particular value of nnpfgc_id and an NNPFGA SEI message with nnpfga_target_id equal to the particular value of nnpfgc_id, the NNPFGC SEI message shall precede the NNPFGA SEI message in decoding order.

nnpfga_cancel_flag equal to 1 indicates that the persistence of the target NNPFG established by any previous NNPFGA SEI message with the same nnpfga_target_id as the current SEI message is cancelled, i.e., the target NNPFG is no longer used unless it is activated by another NNPFGA SEI message with the same nnpfga_target_id as the current SEI message and nnpfga_cancel_flag equal to 0. nnpfga_cancel_flag equal to 0 indicates that the target NNPFG is activated for use.

nnpfga_persistence_flag specifies the persistence of the target NNPFG for the current layer. nnpfga_persistence_flag equal to 0 specifies that the target NNPFG may be used for post-processing filtering for the current picture only.

nnpfga_persistence_flag equal to 1 specifies that the target NNPFG may be used for post-processing filtering for the current picture and all subsequent pictures of the current layer in output order until one or more of the following conditions are true:

A new CLVS of the current layer begins.

The bitstream ends.

A picture in the current layer associated with a NNPFGA SEI message with the same nnpfga_target_id as the current SEI message that follows the current picture in output order.

The target NNPFG is not applied for the subsequent picture in the current layer associated with a NNPFGA SEI message with the same nnpfga_target_id as the current SEI message.

nnpfgcTargetPictures is the set of pictures to which the last NNPFGC SEI message with nnpfgc_id equal to nnpfga_target_id that precedes the current NNPFGA SEI message in decoding order pertains. nnpfgaTargetPictures is the set of pictures for which the target NNPFG is activated by the current NNPFGA SEI message. It is a requirement of bitstream conformance that any picture included in nnpfga-TargetPictures shall also be included in nnpfgcTargetPictures.

nnpfga_num_filters_minus2 plus 2 indicates the number of NNPFs in the NNPFG that this SEI message activates. The value of nnpfga_num_filters_minus2 shall be equal to the value of nnpfgc_num_members_minus2 in an NNPFGC SEI message with nnpfgc_id equal to nnpfga_target_id.

nnpfga_target_base_flag[i] equal to 1 specifies that the i-th NNPF in the target NNPFG is the base NNPF with nnpfc_id equal to nnpfgc_member_id[i] in an NNPFGC SEI message with nnpfgc_id equal to nnpfga_target_id. nnpfga_target_base_flag[i] equal to 0 specifies that the i-th NNPF in the target NNPFG is the NNPF specified by the last NNPFC SEI message that has nnpfc_id equal to nnpfgc_member_id[i] in an NNPFGC SEI message with nnpfgc_id equal to nnpfga_target_id, precedes the first VCL NAL unit of the current picture in decoding order, and is not a repetition of the NNPFC SEI message that contains the base NNPF.

nnpfga_input_all_pics_flag[i] equal to 1 specifies that the input pictures to the i-th NNPF are selected from the list of candidate input pictures candInputPicList[i] without skipping. nnpfga_input_all_pics_flag[i] equal to 0 specifies that the input pictures to the i-th NNPF are selected from the list of candidate input pictures candInputPicList[i] in a manner that some candidate input pictures are skipped.

nnpfga_num_input_pics_minus1 [i] specifies the number of input pictures for the i-th NNPF in the target NNPFG. When present, nnpfga_num_input_pics_minus1 [i] shall be equal to nnpfc_num_input_pics_minus1 for an NNPF with nnpfc_id equal to nnpfgc_member_id[i] of an NNPFGC SEI message with nnpfgc_id equal to nnpfga_target_id. When not present, nnpfga_num_input_pics_minus1 [i] is inferred to be equal to nnpfc_num_input_pics_minus1 for an NNPF with nnpfc_id equal to nnpfgc_member_id[i] in an NNPFGC SEI message with nnpfgc_id equal to nnpfga_target_id.

nnpfga_input_pic_skip_count[i][j] specifies a j-th picture count that is skipped in the list of candidate input pictures candInputPicList[i] when selecting input pictures for the NNPF activated by the i-th loop entry. When nnpfga_input_pic_skip_count[i][j] is not present, it is inferred to be equal to 0 for all values of j in the range of 0 to nnpfga_num_input_pics_minus1 [i], inclusive. The variable numCandInputPics, which indicates the number of candidate input pictures to the NNPFG, is derived as shown in Table 23:

TABLE 23

```
numCandInputPics = 0
for( j = 0; j <= nnpfga_num_input_pics_minus1[ 0 ]; j++ )
    numCandInputPics += 1 + nnpfga_input_pic_skip_count[ 0 ][ j ]
``` candInputPicList[m] for m in the range of 1 to nnpfga_num_filters_minus2+1, inclusive, is a list of pictures in inverse output order that is initially empty and formed in decreasing order of n in the range of 0 to m−1, inclusive, by including each picture that is output by the NNPF process of the n-th loop entry that has no corresponding picture already present in candInputPicList[m], and lastly including each picture present in candInputPicList[0] that has no corresponding picture already present in candInputPicList[m].

When a candidate input picture candInputPicList[m][idx] for any value of m in the range of 1 to nnpfga_num_filters_minus2+1, inclusive, is an NNPF output picture of the n-th NNPF process with the value of n being less than the value of m, the width and height of the candidate input picture are respectively equal to nnpfcOutputPicWidth and nnpfcOutputPicHeight of the NNPF output picture.

The list of input pictures inputPicList[m] to the NNPF of the m-th loop entry is derived as shown in Table 24:

TABLE 24

```
for( k = 0, candIdx = 0; k <= nnpfga_num_input_pics_minus1[ m ]; k++,
candIdx++ ) {
    candIdx += nnpfga_input_pic_skip_count[ m ][ k ]
    inputPicList[ m ][ k ] = candInputPicList[ m ][ candIdx ]
}
```

It is a requirement of bitstream conformance that candIdx shall not exceed the number of pictures in candInputPicList [m].

It is a requirement of bitstream conformance that the pictures present in inputPicList[m], for any value of m in the range of 1 tonnpfga_num_filters_minus2+1, inclusive, shall have the same width, height, bit depth, and chroma format.

For purposes of interpretation of the NNPFC SEI message with nnpfc_id equal to nnpfgc_member_id[i] in an NNPFGC SEI message with nnpfgc_id equal to nnpfga_target_id, the following variables are specified for the i-th loop entry:

The variables BitDepth Y, BitDepthC, and ChromaFormatIdc are used as provided for the interpretation of this SEI message.

CroppedWidth and CroppedHeight are set equal to the width and height of the pictures in inputPicList[i], respectively, in units of luma samples.

For each input picture k in the range of 0 to nnpfga_num_input_pics_minus1 [i], inclusive, the following applies:

CroppedYPic[k], CroppedCbPic[k], and CroppedCrPic [k], when present, are set equal to respective sample array of inputPicList[i][k]

When nnpfc_auxiliary_inp_idc is equal to 1 for the NNPF with nnpfc_id equal to nnpfgc_member_id[i] in an NNPFGC SEI message with nnpfgc_id equal to nnpfga_target_id, the following applies:

It is a requirement of bitstream conformance that inputPicList[i][k] is the same as candInputPicList[0][idx] for any value of idx in the range of 0 to numCandInputPics−1, inclusive.

StrengthControlVal[k] is set equal to InitStrengthControlVal[idx].

nnpfga_num_output_entries [i] specifies the number of nnpfga_output_flag[i][j] syntax elements present in the NNPFGA SEI message. The value of nnpfga_num_output_entries [i] shall be in the range of 0 to NumInpPicsInOutputTensor, inclusive, for an NNPF with nnpfc_id equal to nnpfgc_member_id[i] of an NNPFGC SEI message with nnpfgc_id equal to nnpfga_target_id.

nnpfga_output_flag[i][j] equal to 1 specifies that the NNPF-generated picture that corresponds to the input picture having index InpIdx[j] derived for the i-th NNPF of the target NNPFG is output by the NNPF process activated by this loop entry, where the NNPF process is specified in the semantics of the NNPFC SEI message. nnpfga_output_flag [i][j] equal to 0 specifies that the NNPF-generated picture that corresponds to the input picture having index InpIdx[j]

derived for the i-th NNPF of the target NNPFG is not output by the NNPF process activated by this loop entry. When nnpfga_num_output_entries [i] is less than NumInpPicsIn-OutputTensor derived for the i-th NNPF of the target NNPFG, nnpfga_output_flag[i][j] is inferred to be equal to 1 for each value of i in the range of nnpfga_num_output_entries [i] to NumInpPicsInOutputTensor−1, inclusive.

Let NnpfgaOutputPicList, which is the list of pictures output by NNPF process of the NNPFG in output order, be initially empty and formed in decreasing order of n in the range of 0 to nnpfga_num_filters_minus2+1, inclusive, by including each picture that is output by the NNPF process of the n-th loop entry that has no corresponding picture already present in NnpfgaOutputPicList.

Post-Filter Hint

A syntax structure for a post-filter hint is shown in Table 25.

TABLE 25

|  | Descriptor |
|---|---|
| post_filter_hint( payloadSize ) { | |
|   filter_hint_cancel_flag | u(1) |
|   if( !filter_hint_cancel_flag ) { | |
|     filter_hint_persistence_flag | u(1) |
|     filter_hint_size_y | ue(v) |
|     filter_hint_size_x | ue(v) |
|     filter_hint_type | u(2) |
|     filter_hint_chroma_coeff—present_flag | u(1) |
|     for( cIdx = 0; cIdx < ( filter_hint_chroma_coeff_present_flag ? 3 : 1 ); cIdx++ ) | |
|       for( cy = 0; cy < filter_hint_size_y; cy++ ) | |
|         for( cx = 0; cx < filter_hint_size_x; cx++ ) | |
|           filter_hint_value[ cIdx ][ cy ][ cx ] | se(v) |
|   } | |
| } | |

The post-filter hint syntax structure of Table 25 may be signaled in the form of an SEI message. The SEI message signaling the post-filter hint syntax structure of Table 25 may be referred to as a post-filter hint SEI message.

This SEI message provides the coefficients of a post-filter or correlation information for the design of a post-filter for potential use in post-processing of a set of pictures after they are decoded and output to obtain improved displayed quality.

filter_hint_cancel_flag equal to 1 may indicate that the SEI message cancels the persistence of any previous post-filter hint SEI message in output order that applies to the current layer. filter_hint_cancel_flag equal to 0 may indicate that post-filter hint information follows.

filter_hint_persistence_flag may specify the persistence of the post-filter hint SEI message for the current layer. filter_hint_persistence_flag equal to 0 may specify that the post-filter hint applies to the current decoded picture only. filter_hint_persistence_flag equal to 1 may specify that the post-filter hint SEI message applies to the current decoded picture and persists for all subsequent pictures of the current layer in output order until one or more of the following conditions are true:

A new CLVS of the current layer begins.

The bitstream ends.

A picture in the current layer in an AU associated with a post-filter hint SEI message is output that follows the current picture in output order.

filter_hint_size_y may specify the vertical size of the filter coefficient or correlation array. The value of filter_hint_size_y shall be in the range of 1 to 15, inclusive.

filter_hint_size_x may specify the horizontal size of the filter coefficient or correlation array. The value of filter_hint_size_x shall be in the range of 1 to 15, inclusive.

filter_hint_type may identify the type of the transmitted filter hints as specified in Table 26. The value of filter_hint_type shall be in the range of 0 to 2, inclusive. The value of filter_hint_type equal to 3 may be reserved for future use and shall not be present in bitstreams. Decoders shall ignore post-filter hint SEI messages having filter_hint_type equal to 3.

TABLE 26

| Value | Description |
|---|---|
| 0 | coefficients of 2D-FIR filter |
| 1 | coefficients of two 1D-FIR filters |
| 2 | Cross-correlation matrix | filter_hint_chroma_coeff_present_flag equal 1 may specify that filter coefficients for chroma are present. filter_hint_chroma_coeff_present_flag equal 0 may specify that filter coefficients for chroma are not present.

filter_hint_value[cIdx][cy][cx] may specify a filter coefficient or an element of a cross-correlation matrix between the original and the decoded signal with 16-bit precision. The value of filter_hint_value[cIdx][cy][cx] shall be in the range of $-2^{31}+1$ to $2^{31}-1$, inclusive. cIdx may specifies the related colour component, cy represents a counter in vertical direction and cx represents a counter in horizontal direction. Depending on the value of filter_hint_type, the following applies:

If filter_hint_type is equal to 0, the coefficients of a 2-dimensional finite impulse response (FIR) filter with the size of filter_hint_size_y*filter_hint_size_x may be transmitted.

Otherwise, if filter_hint_type is equal to 1, the filter coefficients of two 1-dimensional FIR filters may be transmitted. In this case, filter_hint_size_y shall be equal to 2. The index cy equal to 0 specifies the filter coefficients of the horizontal filter and cy equal to 1 specifies the filter coefficients of the vertical filter. In the filtering process, the horizontal filter is applied first and the result is filtered by the vertical filter.

Otherwise (filter_hint_type is equal to 2), the transmitted hints may specify a cross-correlation matrix between the original signal s and the decoded signal s'.

The normalized cross-correlation matrix for a related colour component identified by cIdx with the size of filter_hint_size_y*filter_hint_size_x may be defined as shown in Equation 10.

$$\text{filter\_hint\_value}(cIdx, cy, cx) = \frac{1}{\left(2^{8+bitDepth} - 1\right)^2 * h * w} \quad \text{[Equation 10]}$$

$$\sum_{m=0}^{h-1}\sum_{n=0}^{w-1} s(m, n) * s'(m + cy - OffsetY, n + cx - OffsetX)$$

In Equation 10, s denotes array of samples of the colour component cIdx of the original picture, s' denotes corresponding array of the decoded picture, h denotes the vertical height of the related colour component, w denotes the horizontal width of the related colour component, bitDepth denotes the bit depth of the colour component, OffsetY is equal to (filter_hint_size_y>>1), OffsetX is equal to (filter_hint_size_x>>1), the range of cy is 0<=cy<filter_hint_size_y and the range of cx is 0<=cx<filter_hint_size_x.

A decoder can derive a Wiener post-filter from the cross-correlation matrix of original and decoded signal and the auto-correlation matrix of the decoded signal.

Embodiments of the Present Disclosure

Based on the above discussion, in some cases the disclosed configuration for signaling purpose information in neural-network post-filter group characteristic (NNPFGC) SEI message may present deficiencies. Specifically, with regard to nnpfgc_purpose, it may not be clear whether it is constrained to include purpose information of all of its member NNPFC or NNPFGC.

Furthermore, having one aggregate purpose information indicator, i.e., nnpfgc_purpose which combines purpose information of all member NNPFC/NNPFGC, may not provide valuable information. The purpose information for NNPFC/NNPFGC may provide high value at the decoding side by communicating the purpose of each NNPFC/NNPFGC before a decision must be made at the decoding side on whether or not to apply each respective NNPFC/NNPFGC—where such decisions are allowed.

Further, the above disclosure provides for no purpose signaling at all unless nnpfgc_grouping_type is equal to 0 (i.e., where the SEI message specifies a group of cascaded neural-network post-filters) or equal to 2 (i.e., where the SEI message specifies a group of NNPFs that are intended to be used jointly and are activated in an alternating manner so that at most one of these NNPFs is activate for any picture). There may be great benefit in purpose signaling in other cases as well, including at least where nnpfgc_grouping-_type is equal to 1 (i.e., where the NNPFs or NNPF groups identified by the nnpfgc_member_id[i] are alternatives to each other out of which the post-processor should select only one to be applied), or where nnpfgc_grouping_type is equal to 3 (i.e., the NNPFs or NNPF groups identified by the nnpfgc_member_id[i] are intended to be used in parallel). One of ordinary skill in the art will appreciate that this disclosure considers other configurations as well, as further discussed below.

Thus, embodiments of the present disclosure address the above deficiencies with regard to purpose signaling in a neural-network post-filter group characteristic SEI message.

According to a first embodiment, it may be provided that a Direct Member of an NNPFGC is defined as an NNPFC with nnpfc_id equal to nnpfgc_member_id[i] for i ranges from 0 to nnpfgc_num_members_minus2+1, inclusive. Further, an Indirect Member of an NNPFGC is defined as an NNPFC that is a direct or indirect member of another NNPFGC nnpfgcB, in which the value of nnpfgc_id of nnpfgcB is equal to nnpfgc_member_id[i] for i ranges from 0 to nnpfgc_num_members_minus2+1, inclusive.

In the first embodiment, nnpfgc_purpose has the semantics of nnpfc_purpose but with the exception that the semantics are specified for the NNPF group defined by the SEI message rather than the NNPF defined by an NNPFC SEI message. When present, the value of nnpfgc_purpose shall be the union of the values of nnpfc_purpose of direct and indirect member of the NNPFGC.

Alternatively in the first embodiment, nnpfgc_purpose has the semantics of nnpfc_purpose but with the exception that the semantics are specified for the NNPF group defined by the SEI message rather than the NNPF defined by an NNPFC SEI message. When present, the value of nnpfgc_purpose shall be the union of the values of nnpfc_purpose of direct member of the NNPFGC.

According to a second embodiment, it may be provided that a Direct Member of an NNPFGC is defined as an NNPFC with nnpfc_id equal to nnpfgc_member_id[i] for i ranges from 0 to nnpfgc_num_members_minus2+1, inclusive. Further, an Indirect Member of an NNPFGC may be defined as an NNPFC that is a direct or indirect member of another NNPFGC nnpfgcB, in which the value of nnpfgc_id of nnpfgcB is equal to nnpfgc_member_id[i] for i ranges from 0 to nnpfgc_num_members_minus2+1, inclusive.

In the second embodiment, nnpfgc_member_purpose[i] has the semantics of nnpfc_purpose but with the exception that the semantics are specified for the NNPFC or NNPFGC associated with nnpfgc_member[i]. When present, the value of nnpfgc_member_purpose[i] shall be as follows:

If nnpfgc_member_id[i] is equal to the value of nnpfc_id of an NNPFC, the value of nnpfgc_member_purpose[i] shall be equal to the value of nnpfc_purpose of the NNPFC.

Otherwise (i.e., nnpfgc_member_id[i] is equal to the value of nnpfgc_id of an NNPFGC nnpfgcB), the value of nnpfgc_member_purpose[i] shall be equal to the union of the values of nnpfc_purpose of direct and indirect members of nnpfgcB.

The second embodiment may provide the following syntax structure set forth in Table 27 for an updated NNPFC syntax structure:

US 12,634,451 B2

53

54

TABLE 27

|  | Descriptor |
|---|---|
| nn_post_filter_group_characteristics( payloadSize ) { |  |
|   nnpfgc_id | ue(v) |
|   nnpfgc_grouping_type | ue(v) |
|   if( nnpfgc_grouping_type = = 0 \| \| nnpfgc_grouping_type = = 2 ) |  |
|     nnpfgc_purpose | u(16) |
|   nnpfgc_num_members_minus2 | ue(v) |
|   for( i = 0; i <= nnpfgc_num_members_minus2 + 1; i++ ) { |  |
|     nnpfgc_member_id[ i ] | ue(v) |
|     if( nnpfgc_grouping_type = = 1 \| \| nnpfgc_grouping_type = = 3 ) |  |
|       nnpfgc_member_purpose[ i ] | u(16) |
|   } |  |
|   ... |  |
| } |  |

According to a third embodiment of the present disclosure, it may be provided that a Direct Member of an NNPFGC is defined as an NNPFC with nnpfc_id equal to nnpfgc_member_id[i] for i ranges from 0 to nnpfgc_num_members_minus2+1, inclusive. Further, an Indirect Member of an NNPFGC may be defined as an NNPFC that is a direct or indirect member of another NNPFGC nnpfgcB, in which the value of nnpfgc_id of nnpfgcB is equal to nnpfgc_member_id[i] for i ranges from 0 to nnpfgc_num_members_minus2+1, inclusive.

In the third embodiment, nnpfgc_purpose has the semantics of nnpfc_purpose but with the exception that the semantics are specified for the NNPF group defined by the SEI message rather than the NNPF defined by an NNPFC SEI message. When present, the value of nnpfgc_purpose shall be the union of the values of nnpfc_purpose of direct and indirect members of the NNPFGC.

Alternatively in the third embodiment, nnpfgc_purpose has the semantics of nnpfc_purpose but with the exception that the semantics are specified for the NNPF group defined by the SEI message rather than the NNPF defined by an NNPFC SEI message. When present, the value of nnpfgc_purpose shall be the union of the values of nnpfc_purpose of direct members of the NNPFGC.

In the third embodiment, nnpfgc_member_purpose[i] has the semantics of nnpfc_purpose but with the exception that the semantics are specified for the NNPFC or NNPFGC associated with nnpfgc_member[i]. When present, the value of nnpfgc_member_purpose[i] shall be as follows:

If nnpfgc_member_id[i] is equal to the value of nnpfc_id of an NNPFC, the value of nnpfgc_member_purpose[i] shall be equal to the value of nnpfc_purpose of the NNPFC.

Otherwise (i.e., nnpfgc_member_id[i] is equal to the value of nnpfgc_id of an NNPFGC nnpfgcB), the value of nnpfgc_member_purpose[i] shall be equal to nnpfgc_purpose of nnpfgcB.

According to a fourth embodiment of the present disclosure, it may be provided that a Direct Member of an NNPFGC is defined as an NNPFC with nnpfc_id equal to nnpfgc_member_id[i] for i ranges from 0 to nnpfgc_num_members_minus2+1, inclusive. Further, an Indirect Member of an NNPFGC may be defined as an NNPFC that is a direct or indirect member of another NNPFGC nnpfgcB, in which the value of nnpfgc_id of nnpfgcB is equal to nnpfgc_member_id[i] for i ranges from 0 to nnpfgc_num_members_minus2+1, inclusive.

In the fourth embodiment, nnpfgc_purpose has the semantics of nnpfc_purpose but with the exception that the semantics are specified for the NNPF group defined by the SEI message rather than the NNPF defined by an NNPFC SEI message. The value of nnpfgc_purpose shall be the union of the values of nnpfc_purpose of direct and indirect members of the NNPFGC.

The fourth embodiment may provide the following syntax structure set forth in Table 28 for an updated NNPFC syntax structure:

TABLE 28

|  | Descriptor |
|---|---|
| nn_post_filter_group_characteristics( payloadSize ) { |  |
|   nnpfgc_id | ue(v) |
|   nnpfgc_grouping_type | ue(v) |
|     nnpfgc_purpose | u(16) |
|   nnpfgc_num_members_minus2 | ue(v) |
|   for( i = 0; i <= nnpfgc_num_members_minus2 + 1; i++ ) |  |
|     nnpfgc_member_id[ i ] | ue(v) |
|   ... |  |
| } |  |

According to a fifth embodiment of the present disclosure, it may be provided that a Direct Member of an NNPFGC is defined as an NNPFC with nnpfc_id equal to nnpfgc_member_id[i] for i ranges from 0 to nnpfgc_num_members_minus2+1, inclusive. Further, an Indirect Member of an NNPFGC may be defined as an NNPFC that is a direct or indirect member of another NNPFGC nnpfgcB, in which the value of nnpfgc_id of nnpfgcB is equal to nnpfgc_member_id[i] for i ranges from 0 to nnpfgc_num_members_minus2+1, inclusive.

In the fifth embodiment, nnpfgc_member_purpose[i] has the semantics of nnpfc_purpose but with the exception that the semantics are specified for the NNPFC or NNPFGC associated with nnpfgc_member[i]. The value of nnpfgc_member_purpose[i] shall be as follows:

If nnpfgc_member_id[i] is equal to the value of nnpfc_id of an NNPFC, the value of nnpfgc_member_purpose[i] shall be equal to the value of nnpfc_purpose of the NNPFC.

Otherwise (i.e., nnpfgc_member_id[i] is equal to the value of nnpfgc_id of an NNPFGC nnpfgcB), the value of nnpfgc_member_purpose[i] shall be equal to the union of the values of nnpfc_purpose of direct and indirect members of nnpfgcB.

The fifth embodiment may provide the following syntax structure set forth in Table 29 for an updated NNPFC syntax structure:

TABLE 29

|  | Descriptor |
|---|---|
| nn_post_filter_group_characteristics( payloadSize ) { |  |
|    nnpfgc_id | ue(v) |
|    nnpfgc_grouping_type | ue(v) |
|    nnpfgc_num_members_minus2 | ue(v) |
|    for( i = 0; i <= nnpfgc_num_members_minus2 + 1; i++ ) { |  |
|       nnpfgc_member_id[ i ] | ue(v) |
|       nnpfgc_member_purpose[ i ] | u(16) |
|    } |  |
|    ... |  |
| } |  |

According to a sixth embodiment of the present disclosure, it may be provided that a Direct Member of an NNPFGC is defined as an NNPFC with nnpfc_id equal to nnpfgc_member_id[i] for i ranges from 0 to nnpfgc_num_members_minus2+1, inclusive. Further, an Indirect Member of an NNPFGC may be defined as an NNPFC that is a direct or indirect member of another NNPFGC nnpfgcB, in which the value of nnpfgc_id of nnpfgcB is equal to nnpfgc_member_id[i] for i ranges from 0 to nnpfgc_num_members_minus2+1, inclusive.

In the sixth embodiment, nnpfgc_member_purpose_present_flag equal 1 specifies that syntax element nnpfgc_member_purpose[i] is present. nnpfgc_member_purpose_present_flag equal 0 specifies that syntax element nnpfgc_member_purpose[i] is not present.

In the sixth embodiment, nnpfgc_member_purpose[i] has the semantics of nnpfc_purpose but with the exception that the semantics are specified for the NNPFC or NNPFGC associated with nnpfgc_member[i].

The value of nnpfgc_member_purpose[i] shall be as follows:

If nnpfgc_member_id[i] is equal to the value of nnpfc_id of an NNPFC, the value of nnpfgc_member_purpose[i] shall be equal to the value of nnpfc_purpose of the NNPFC.

Otherwise (i.e., nnpfgc_member_id[i] is equal to the value of nnpfgc_id of an NNPFGC nnpfgcB), the value of nnpfgc_member_purpose[i] shall be equal to the union of the values of nnpfc_purpose of direct and indirect members of nnpfgcB.

The sixth embodiment may provide the following syntax structure set forth in Table 30 for an updated NNPFC syntax structure:

According to a seventh embodiment of the present disclosure, it may be provided that a Direct Member of an NNPFGC is defined as an NNPFC with nnpfc_id equal to nnpfgc_member_id[i] for i ranges from 0 to nnpfgc_num_members_minus2+1, inclusive. Further, an Indirect Member of an NNPFGC may be defined as an NNPFC that is a direct or indirect member of another NNPFGC nnpfgcB, in which the value of nnpfgc_id of nnpfgcB is equal to nnpfgc_member_id[i] for i ranges from 0 to nnpfgc_num_members_minus2+1, inclusive.

In the seventh embodiment, nnpfgc_member_purpose_present_flag equal 1 specifies that syntax element nnpfgc_member_purpose[i] is present.

nnpfgc_member_purpose_present_flag equal 0 specifies that syntax element nnpfgc_member_purpose[i] is not present.

In the seventh embodiment, nnpfgc_member_purpose[i] has the semantics of nnpfc_purpose but with the exception that the semantics are specified for the NNPFC or NNPFGC associated with nnpfgc_member[i].

When present, the value of nnpfgc_member_purpose[i] shall be as follows:

If nnpfgc_member_id[i] is equal to the value of nnpfc_id of an NNPFC, the value of nnpfgc_member_purpose[i] shall be equal to the value of nnpfc_purpose of the NNPFC.

Otherwise (i.e., nnpfgc_member_id[i] is equal to the value of nnpfgc_id of an NNPFGC nnpfgcB), the value of nnpfgc_member_purpose[i] shall be equal to the union of the values of nnpfc_purpose of direct and indirect members of nnpfgcB.

The seventh embodiment may provide the following syntax structure set forth in Table 31 for an updated NNPFC syntax structure:

TABLE 30

|  | Descriptor |
|---|---|
| nn_post_filter_group_characteristics( payloadSize ) { |  |
|    nnpfgc_id | ue(v) |
|    nnpfgc_grouping_type | ue(v) |
|    nnpfgc_member_purpose_present_flag | u(1) |
|    nnpfgc_num_members_minus2 | ue(v) |
|    for( i = 0; i <= nnpfgc_num_members_minus2 + 1; i++ ) { |  |
|       nnpfgc_member_id[ i ] | ue(v) |
|       if( nnpfgc_member_purpose_present_flag ) |  |
|          nnpfgc_member_purpose[ i ] | u(16) |
|    } |  |
|    ... |  |
| } |  |

TABLE 31

| | Descriptor |
|---|---|
| nn_post_filter_group_characteristics( payloadSize ) { | |
|   nnpfgc_id | ue(v) |
|   nnpfgc_grouping_type | ue(v) |
|   if( nnpfgc_grouping_type = = 0 \| \| nnpfgc_grouping_type = = 2 ) | |
|     nnpfgc_purpose | u(16) |
|   nnpfgc_member_purpose_present_flag | u(1) |
|   nnpfgc_num_members_minus2 | ue(v) |
|   for( i = 0; i <= nnpfgc_num_members_minus2 + 1; i++ ) { | |
|     nnpfgc_member_id[ i ] | ue(v) |
|     if( nnpfgc_member_purpose_present_flag ) | |
|       nnpfgc_member_purpose[ i ] | u(16) |
|   } | |
|   ... | |
| } | |

According to an eighth embodiment of the present disclosure, it may be provided that a Direct Member of an NNPFGC is defined as an NNPFC with nnpfc_id equal to nnpfgc_member_id[i] for i ranges from 0 to nnpfgc_num_members_minus2+1, inclusive. Further, an Indirect Member of an NNPFGC may be defined as an NNPFC that is a direct or indirect member of another NNPFGC nnpfgcB, in which the value of nnpfgc_id of nnpfgcB is equal to nnpfgc_member_id[i] for i ranges from 0 to nnpfgc_num_members_minus2+1, inclusive.

In the eighth embodiment, nnpfgc_member_purpose_present_flag equal 1 specifies that syntax element nnpfgc_member_purpose[i] is present. nnpfgc_member_purpose_present_flag equal 0 specifies that syntax element nnpfgc_member_purpose[i] is not present.

In the eighth embodiment, nnpfgc_member_purpose[i] has the semantics of nnpfc_purpose but with the exception that the semantics are specified for the NNPFC or NNPFGC associated with nnpfgc_member[i].

When present, the value of nnpfgc_member_purpose[i] shall be as follows:

If nnpfgc_member_id[i] is equal to the value of nnpfc_id of an NNPFC, the value of nnpfgc_member_purpose[i] shall be equal to the value of nnpfc_purpose of the NNPFC.

Otherwise (i.e., nnpfgc_member_id[i] is equal to the value of nnpfgc_id of an NNPFGC nnpfgcB), the value of nnpfgc_member_purpose[i] shall be equal to the union of the values of nnpfc_purpose of direct and indirect members of nnpfgcB.

The eighth embodiment may provide the following syntax structure set forth in Table 32 for an updated NNPFC syntax structure:

TABLE 32

| | Descriptor |
|---|---|
| nn_post_filter_group_characteristics( payloadSize ) { | |
|   nnpfgc_id | ue(v) |
|   nnpfgc_grouping_type | ue(v) |
|   if( nnpfgc_grouping_type = = 0 \| \| nnpfgc_grouping_type = = 2 ) | |
|     nnpfgc_purpose | u(16) |
|   if( nnpfgc_grouping_type = = 1 \| \| nnpfgc_grouping_type = = 3 \| \| nnpfgc_grouping_type = = 4 ) | |
|     nnpfgc_member_purpose_present_flag | u(1) |
|   nnpfgc_num_members_minus2 | ue(v) |
|   for( i = 0; i <= nnpfgc_num_members_minus2 + 1; +++ ) { | |
|     nnpfgc_member_id[ i ] | ue(v) |
|     if( nnpfgc_member_purpose_present_flag ) | |
|       nnpfgc_member_purpose[ i ] | u(16) |
|   } | |
|   ... | |
| } | |

According to a ninth embodiment of the present disclosure, it may be provided that a Direct Member of an NNPFGC is defined as an NNPFC with nnpfc_id equal to nnpfgc_member_id[i] for i ranges from 0 to nnpfgc_num_members_minus2+1, inclusive. Further, an Indirect Member of an NNPFGC may be defined as an NNPFC that is a direct or indirect member of another NNPFGC nnpfgcB, in which the value of nnpfgc_id of nnpfgcB is equal to nnpfgc_member_id[i] for i ranges from 0 to nnpfgc_num_members_minus2+1, inclusive.

In the ninth embodiment, nnpfgc_purpose_present_flag equal 1 specifies that syntax element nnpfgc_purpose is present. nnpfgc_purpose_present_flag equal 0 specifies that syntax element nnpfgc_purpose is not present.

In the ninth embodiment, nnpfgc_purpose has the semantics of nnpfc_purpose but with the exception that the semantics are specified for the NNPF group defined by this SEI message rather than the NNPF defined by an NNPFC SEI message. The value of nnpfgc_purpose shall be the union of the values of nnpfc_purpose of direct and indirect member of the NNPFGC.

The ninth embodiment may provide the following syntax structure set forth in Table 33 for an updated NNPFC syntax structure:

TABLE 33

| | Descriptor | |
|---|---|---|
| nn_post_filter_group_characteristics( payloadSize ) { | | |
|   nnpfgc_id | ue(v) | 5 |
|   nnpfgc_grouping_type | ue(v) | |
|   nnpfgc_purpose_present_flag | u(1) | |
|   if( nnpfgc_purpose_present_flag ) | | |
|     nnpfgc_purpose | u(16) | |
|   nnpfgc_num_members_minus2 | ue(v) | |
|   for( i = 0; i <= nnpfgc_num_members_minus2 + 1; i++ ) | | 10 |
|     nnpfgc_member_id[ i ] | ue(v) | |
|   ... | | |
| } | | |

If nnpfgc_member_id[i] is equal to the value of nnpfc_id of an NNPFC, the value of nnpfgc_member_purpose[i] shall be equal to the value of nnpfc_purpose of the NNPFC.

Otherwise (i.e., nnpfgc_member_id[i] is equal to the value of nnpfgc_id of an NNPFGC nnpfgcB), the value of nnpfgc_member_purpose[i] shall be equal to the union of the values of nnpfc_purpose of direct and indirect members of nnpfgcB.

The tenth embodiment may provide the following syntax structure set forth in Table 34 for an updated NNPFC syntax structure:

TABLE 34

| | Descriptor |
|---|---|
| nn_post_filter_group_characteristics( payloadSize ) { | |
|   nnpfgc_id | ue(v) |
|   nnpfgc_grouping_type | ue(v) |
|   nnpfgc_member_purpose_present_flag | u(1) |
|   if( !nnpfgc_member_purpose_present_flag ) | |
|     nnpfgc_purpose | u(16) |
|   nnpfgc_num_members_minus2 | ue(v) |
|   for( i = 0; i <= nnpfgc_num_members_minus2 + 1; i++ ) { | |
|     nnpfgc_member_id[ i ] | ue(v) |
|     if( nnpfgc_member_purpose_present_flag ) | |
|       nnpfgc_member_purpose[ i ] | u(16) |
|   } | |
|   ... | |
| } | |

According to a tenth embodiment of the present disclosure, it may be provided that a Direct Member of an NNPFGC is defined as an NNPFC with nnpfc_id equal to nnpfgc_member_id[i] for i ranges from 0 to nnpfgc_num_members_minus2+1, inclusive. Further, an Indirect Member of an NNPFGC may be defined as an NNPFC that is a direct or indirect member of another NNPFGC nnpfgcB, in which the value of nnpfgc_id of nnpfgcB is equal to nnpfgc_member_id[i] for i ranges from 0 to nnpfgc_num_members_minus2+1, inclusive.

In the tenth embodiment, nnpfgc_member_purpose_present_flag equal 1 specifies that syntax element nnpfgc_member_purpose[i] is present and nnpfgc_purpose is not present. nnpfgc_member_purpose_present_flag equal 0 specifies that syntax element nnpfgc_member_purpose[i] is not present and nnpfgc_purpose is present.

In the tenth embodiment, nnpfgc_purpose has the semantics of nnpfc_purpose but with the exception that the semantics are specified for the NNPF group defined by this SEI message rather than the NNPF defined by an NNPFC SEI message. The value of nnpfgc_purpose shall be the union of the values of nnpfc_purpose of direct and indirect member of the NNPFGC.

In the tenth embodiment, nnpfgc_member_purpose[i] has the semantics of nnpfc_purpose but with the exception that the semantics are specified for the NNPFC or NNPFGC associated with nnpfgc_member[i].

When present, the value of nnpfgc_member_purpose[i] shall be as follows:

A summary of various examples of embodiments of the present disclosure may be provided as follows.

In an embodiment, a Direct Member of an NNPFGC may be defined as NNPFC with nnpfc_id equal to nnpfgc_member_id[i] for i ranges from 0 to nnpfgc_num_members_minus2+1, inclusive.

In an embodiment, an Indirect Member of an NNPFGC may be defined as an NNPFC that is a direct or indirect member of another NNPFGC nnpfgcB, in which the value of nnpfgc_id of nnpfgcB is equal to nnpfgc_member_id[i] for i ranges from 0 to nnpfgc_num_members_minus2+1, inclusive.

In an embodiment, it is constrained that the value of nnpfgc_purpose in NNPFGC, when present, includes all purposes of NNPFC or NNPFGC included in the NNPFGC.

In an embodiment, when nnpfgc_grouping_type is equal to 1 (i.e., alternative grouping), purpose information is signaled for each NNPFGC or NNPFGC included in the NNPFGC. This purpose information may be signaled as nnpfgc_member_purpose[i] and the following applies:

If nnpfgc_member_id[i] is equal to nnpfc_id of a particular NNPFC, the value of nnpfgc_member_purpose[i] shall be equal to the value of nnpfc_purpose of the NNPFC with nnpfc_id is equal to nnpfgc_member_id [i].

Otherwise (i.e., nnpfgc_member_id[i] is equal to nnpfgc_id of a particular NNPFGC), the value of nnpfgc_member_purpose[i] shall be the union of the values of nnpfgc_member_purpose[i] in the NNPFGC.

In an embodiment, when nnpfgc_grouping_type is equal to 3 (i.e., parallel grouping), purpose information is signaled for each NNPFGC or NNPFGC included in the NNPFGC. This purpose information may be signaled as nnpfgc_member_purpose[i].

In an embodiment, syntax element nnpfgc_purpose in NNPFGC may be signaled unconditionally and irrespective of the value of nnpfgc_grouping_type.

In an embodiment, syntax element nnpfgc_purpose is not signaled, instead, nnpfgc_member_purpose[i] is signaled for each NNPFC or NNPFGC included in the NNFPGC regardless the value of nnpfgc_grouping_type.

In an embodiment, a flag may be signaled (i.e., nnpfgc_member_purpose_present_flag) that specifies whether or not nnpfgc_member_purpose[i] is present.

In an embodiment, a flag may be signaled (i.e., nnpfgc_purpose_present_flag) that specifies whether or not nnpfgc_purpose is present.

In an embodiment, only one flag is signaled that specifies which purpose value (nnpfgc_purpose or nnpfgc_member_purpose[i]) is present in the SEI message.

FIG. 6 depicts an example of a method 600 of performing filtering for decoding image data, according to an embodiment of the present disclosure. Although the example of FIG. 6 discusses the features related a method performed at a decoder, it will be understood that similar and corresponding features are disclosed for being performed at the encoder of the SEI message.

An example according to an embodiment of the present disclosure includes obtaining, at 602, a neural network post-filter (NNPF) group (NNPFG) characteristics supplemental enhancement information (SEI) message specifying information related to a group of two or more NNPFs to be applied to the image data. The SEI message may be received at a decoder configured to decode a bitstream comprising the SEI message, and to apply NNPFs to the image data of the bitstream.

The example may further include determining, at 604, a grouping type of the group of the two or more NNPFs based on the SEI message. In the examples discussed above, some embodiments may include determining whether nnpfgc_grouping_type is equal to 1 (i.e., where the NNPFs or NNPF groups identified by the nnpfgc_member_id[i] are alternatives to each other out of which the post-processor should select only one to be applied), or whether nnpfgc_grouping_type is equal to 3 (i.e., the NNPFs or NNPF groups identified by the nnpfgc_member_id[i] are intended to be used in parallel).

The example may further include obtaining, at 606, a value corresponding to a purpose of each of the group of the two or more NNPFs, based on the grouping type indicating that only one of the group of the two or more NNPFs is to be selected to be applied, or that the group of the two or more NNPFs are to be applied in parallel. In examples discussed above, this may include values including nnpfgc_member_purpose or nnpfgc_member_purpose[i].

Further, the example may include applying, at 608, at least one of the group of the two or more NNPFs to the image data based the obtained value. According to the example discussed above, NNPFs or NNPF groups may be applied post-filtering based on the purpose information provided by the SEI message for each of the NNPFs and member NNPFs of the NNPF groups, where the NNPFs or NNPF groups identified by the nnpfgc_member_id[i] are alternatives to each other out of which the post-processor should select only one to be applied, or where the NNPFs or NNPF groups identified by the nnpfgc_member_id[i] are intended to be used in parallel.

Implementations according to the present disclosure described above may be implemented in the form of computer programs that may be executed through various components on a computer, and such computer programs may be recorded in a computer-readable medium. Examples of the computer-readable media include, but are not limited to: magnetic media such as hard disks, floppy disks, and magnetic tape; optical media such as CD-ROM disks and DVD-ROM disks; magneto-optical media such as floptical disks; and hardware devices that are specially configured to store and execute program codes, such as ROM, RAM, and flash memory devices.

Meanwhile, the computer programs may be those specially designed and constructed for the purposes of the present disclosure or they may be of the kind well known and available to those skilled in the computer software arts. Examples of program code include both machine codes, such as produced by a compiler, and higher level code that may be executed by the computer using an interpreter.

As used in the present disclosure (especially in the appended claims), the singular forms "a," "an," and "the" include both singular and plural references, unless the context clearly states otherwise. Also, it should be understood that any numerical range recited herein is intended to include all sub-ranges subsumed therein (unless expressly indicated otherwise) and accordingly, the disclosed numeral ranges include every individual value between the minimum and maximum values of the numeral ranges.

Operations constituting the method of the present disclosure may be performed in appropriate order unless explicitly described in terms of order or described to the contrary. The present disclosure is not necessarily limited to the order of operations given in the description. All examples described herein or the terms indicative thereof ("for example," etc.) used herein are merely to describe the present disclosure in greater detail. Therefore, it should be understood that the scope of the present disclosure is not limited to the example implementations described above or by the use of such terms unless limited by the appended claims. Also, it should be apparent to those skilled in the art that various alterations, substitutions, and modifications may be made within the scope of the appended claims or equivalents thereof.

What is claimed is:

1. An image decoding method performed by an image decoding apparatus, the image decoding method comprising:

obtaining a neural network post-filter (NNPF) group (NNPFG) characteristics supplemental enhancement information (SEI) message specifying information related to a group of two or more NNPFs to be applied to image data;

determining a grouping type of the group of the two or more NNPFs based on the message;

based on the grouping type indicating that only one of the group of the two or more NNPFs is to be selected to be applied, or that the group of the two or more NNPFs are to be applied in parallel, obtaining a value corresponding to a purpose of each of the group of the two or more NNPFs; and applying at least one of the group of the two or more NNPFs to the image data based the obtained value.

2. The method of claim 1, wherein the obtained value corresponds to a union of values corresponding to the purpose of each of the group of the two or more NNPFs.

3. The method of claim 1, wherein at least one member of the group of the two or more NNPFs is a member NNPF group.

4. The method of claim 3, wherein the obtained value corresponding to a purpose of the member NNPF group is a union of values corresponding to purposes of all member NNPFs of the member NNPF group.

5. An image decoding method performed by an image decoding apparatus, the image decoding method comprising:

obtaining a neural network post-filter (NNPF) group (NNPFG) characteristics supplemental enhancement information (SEI) message specifying information related to a group of two or more NNPFs to be applied to image data;

obtaining at least one value corresponding to a purpose of the two or more NNPFs of the group; and applying at least one of the group of two or more NNPFs to the image data based on the obtained value.

6. The method of claim 5, wherein a member of the group may be an NNPF group comprising another group of two or more NNPFs.

7. The method of claim 5, wherein the SEI message comprises a flag indicating whether the at least one value corresponding to the purpose of the group of the two or more NNPFs is present in the SEI message.

8. The method of claim 5, wherein the at least one value comprises a list including a purpose value for each member NNPF of the group.

9. The method of claim 5, wherein the at least one value comprises a union of values corresponding to purposes of all member NNPFs of the group.

10. An image encoding method performed by an image encoding apparatus, the image encoding method comprising:

encoding a neural network post-filter (NNPF) group (NNPFG) characteristics supplemental enhancement information (SEI) message including information related to a group of two or more NNPFs to be applied to image data, wherein a grouping type of the group of the two or more NNPFs are determinable based on the encoded SEI message, wherein based on the grouping type indicating that only one of the group of the two or more NNPFs is to be selected to be applied, or that the group of the two or more NNPFs are to be applied in parallel, a value is encoded in the SEI message corresponding to a purpose of each of the group of the two or more NNPFs; and transmitting the encoded SEI message wherein, based on the SEI message, at least one of the group of the two or more NNPFs to the image data are to be applied based the encoded value.

11. The method of claim 10, wherein the encoded value corresponds to a union of values corresponding to the purpose of each of the group of the two or more NNPFs.

12. The method of claim 11, wherein at least one member of the group of the two or more NNPFs is a member NNPF group.

13. The method of claim 12, wherein the encoded value corresponding to a purpose of the member NNPF group is a union of values corresponding to purposes of all member NNPFs of the member NNPF group.

\* \* \* \* \*